United States Patent
Kubota et al.

(10) Patent No.: US 7,042,506 B2
(45) Date of Patent: May 9, 2006

(54) SOLID STATE IMAGE PICK-UP SYSTEM

(75) Inventors: Akihiro Kubota, Hachioji (JP);
Yukihiro Sugimoto, Hachioji (JP);
Toshiyuki Noguchi, Hachioji (JP);
Hiroshi Itoh, Hachioji (JP)

(73) Assignee: Olympus Corporation, Tokyo (JP)

( * ) Notice: Subject to any disclaimer, the term of this patent is extended or adjusted under 35 U.S.C. 154(b) by 760 days.

(21) Appl. No.: 10/281,562

(22) Filed: Oct. 28, 2002

(65) Prior Publication Data

US 2003/0090576 A1 May 15, 2003

Related U.S. Application Data

(62) Division of application No. 09/870,607, filed on May 31, 2001, now Pat. No. 6,504,573, which is a division of application No. 08/864,934, filed on May 29, 1997, now Pat. No. 6,304,293.

(30) Foreign Application Priority Data

May 31, 1996 (JP) .................. H8-138663
Apr. 25, 1997 (JP) .................. H9-109347

(51) Int. Cl.
*H04N 9/83* (2006.01)
(52) U.S. Cl. .................. 348/270; 348/220.1
(58) Field of Classification Search ........... 348/270, 348/220.1
See application file for complete search history.

(56) References Cited

U.S. PATENT DOCUMENTS

| 4,967,264 | A | * | 10/1990 | Parulski et al. ............ 348/271 |
| 5,046,162 | A | * | 9/1991 | Ishikawa et al. ............ 348/270 |
| 5,103,300 | A | * | 4/1992 | Nitta et al. ............ 348/270 |
| 5,155,585 | A | | 10/1992 | Ishikawa |
| 5,548,333 | A | | 8/1996 | Shibazaki |
| 5,705,806 | A | | 1/1998 | Matsuda et al. |
| 5,734,424 | A | | 3/1998 | Sasaki |
| 5,754,229 | A | | 5/1998 | Elabd |
| 6,005,616 | A | | 12/1999 | Itoh et al. |

FOREIGN PATENT DOCUMENTS

JP 7-79448 3/1995

* cited by examiner

*Primary Examiner*—Tuan Ho
(74) *Attorney, Agent, or Firm*—Volpe and Koenig, P.C.

(57) ABSTRACT

A solid-state image pick-up system according to the present invention comprises an image pick-up lens for making incident light from a subject form an image on an image pick-up surface, a light source alternately emitting a plurality of color light beams at a given period, a solid-state image pick-up device for receiving the subject light separated through the color separating section to convert it into a given subject picture signal, an image pick-up mode selecting circuit for selecting one of a standard mode for picking up a dynamic mode and a high-sensitivity mode for picking up a still picture, and a control section for controlling the period for the color separating section on the basis of the output of the image pick-up mode selecting circuit.

14 Claims, 18 Drawing Sheets

SOLID STATE IMAGE PICK-UP SYSTEM

CROSS REFERENCE TO RELATED APPLICATION(S)

This application is a divisional of U.S. patent application Ser. No. 09/870,607, filed May 31, 2001, now U.S. Pat. No. 6,504,573, which in turn is a divisional of U.S. patent application Ser. No. 08/864,934, filed May 29, 1997, which issued on Oct. 16, 2001 as U.S. Pat. No. 6,304,293, which are incorporated by reference as if fully set forth.

BACKGROUND

The present invention relates to a solid-state image pick-up system, and more particularly to a solid-state image pickup system based upon a field-sequence technique.

SUMMARY

So far, various types solid-state image pick-up systems have been proposed, which are equipped with a rotary filter conducting a color separation with a solid-state image pick-up device, and as one instance there has been known a field-sequence type solid-state image pick-up system. This field-sequence type solid-state image pickup system separates light incident on a solid-state image pick-up device through the use of a rotary filter into R, G, and B in time sequence, with the solid-state image pick-up device outputting R, G, and B time series signals during one revolution of the rotary filter. Further, the R, G, and B signals in the time sequence are put in given memories, respectively, and the output signals are made to simultaneously occur in a manner that the reading timings thereof from the memories are set to be coincident with each other, and then delivered to a monitor or something after undergoing a given process.

One example of arrangements of the prior field-sequence type solid-state image pick-up system will be described hereinbelow with reference to FIG. 22.

In the illustration, the solid-state image pick-up system is provided with a camera lens 2 accepting an incident light beam 1 such as a subject light beam on the front side of camera body 3, while being equipped with a R, G, and B rotary filter 4 in the rear of the camera lens 2 the rotary filter 4. In addition, a solid-state image pick-up device 5 is located at the back of the rotary filter 4, with the subject light beam separated through the rotary filter 4 into R, G, and B is incident on the solid-state image pick-up device 5.

The output signal of the solid-state image pick-up device 5 is amplified through a preamplifier 6 and then outputted through an A/D converter 12, a signal processing circuit 13 including a simultaneously generating circuit 13, a D/A converter 14 and an output terminal 15 to external equipment.

On the other hand, the camera body 3 has a synchronizing signal generating circuit 9, so that the rotary filter 4 and the solid-state image pick-up device 5 are driven by an electric motor 9 and a drive circuit 10 which operate in accordance with a synchronizing signal produced in the synchronizing signal generating circuit 9. Further, the rotation of the rotary filter 4 is detectable with a photointerrupter 7 disposed in the vicinity of the rotary filter 4, with the detection signal being inputted into the synchronizing signal generating circuit 9 to execute the control of rotation of the rotary filter 4. The drive circuit 10 is composed of a pulse drive circuit and a bias circuit for the drive of the solid-state image pick-up device 5.

In the field-sequence type solid-state image pick-up system with the above-mentioned arrangement, when the solid-state image pick-up device 5 outputs the R, G, and B time series signals during one revolution of the rotary filter 4, for reading out the signals from the solid-state image pick-up device 5, there are known a first method in which one fields (for example, odd number fields) of the R, G, and B signals are read out therefrom at the first cycle of the rotary filter 4 whereas the other fields (for example, even number fields) are read out therefrom at the second cycle thereof and a second method in which both the fields of the R, G, and B signals are read out therefrom for a time period corresponding to one revolution of the rotary filter 4.

Assuming that the accumulation time for one color of R, G, and B takes $\frac{1}{60}$ second, since according to the first method the reception of one picture is possible with 3 fields, it is possible to output 20 pictures for 1 second. On the other hand, according to the second method, the reception of one picture is practicable with 6 fields so that the output of only 10 pictures is made for 1 second. This signifies that both the first and second methods take 0.1 second for the reception of a picture of one frame.

Consequently, the first method is advantageous in reducing the so-called color shift which can occur because at the pick-up of a dynamic picture the subject moves during the time period of one revolution of the rotary filter 4 so that the R, G, and B differ in position.

For sensitizing in such a case as to photograph a subject with a low illuminance, there has been known a way of lengthening the accumulation time per one color as compared with the case of a subject with a common brightness. However, assuming that the accumulation time for one color is 1 second, the above-mentioned first method requires 6 seconds for the reception of one-frame picture, thus deteriorating the operating performance.

Accordingly, it is a first object of the present invention to provide a solid-state image pick-up system which is capable of minimizing the time needed for the reception of a picture even in the case of the lengthened accumulation time.

A second object of this invention is to provide a solid-state image pick-up system which is capable of shortening the picture reception time even in a high-sensitivity mode.

A third object of this invention is to provide a solid-state image pick-up system which is capable of improving an S/N ratio in a standard mode.

A fourth object of this invention is to provide a solid-state image pick-up system in which the switching to a standard mode shortening an accumulation time in a solid-state image pick-up device automatically takes place in the case of switching from a still or static picture to a dynamic picture in a high-sensitivity mode, thus lessening the color shift.

A fifth object of this invention is to provide a solid-state image pick-up system which is capable of distinguishing between a dynamic picture and a still picture through a microscope without depending upon a subject for sure switching to a standard mode.

A sixth object of this invention is to provide a solid-state image pick-up system which is capable of improving an S/N ratio in accordance with an input signal level.

A seventh object of this invention is to provide a solid-state image pick-up system which is designed to automatically switch from a high-sensitivity mode to a standard mode, thus enhancing its controllability.

An eighth object of this invention is to provide a solid-state image pick-up system in which, in the case of focusing under a microscope, decision is made to that it is under the focusing even if difficulty is encountered to size up the focused condition and the switching to a standard mode is made on that decision.

A ninth object of this invention is to provide a solid-state image pick-up system which is capable of simplifying its circuits.

A tenth object of this invention is to provide a solid-state image pick-up system which is capable of resolving the occurrence of a difference between an odd number filed and an even number field.

Briefly, a solid-state image pick-up system according to the present invention comprises: an image pick-up lens for forming an image corresponding to an incident light from a subject on an image pick-up plane; color separation means for separating the incident light into a plurality of color components at a given cycle or period; a solid-state image pick-up device for receiving the subject light separated in the color separation means to convert it into a given subject image signal; image pick-up mode selection means for selecting a standard mode for picking up a dynamic picture and a high-sensitivity mode for picking up a still picture; and control means for controlling the cycle of the color separation means in accordance with the output of the image pick-up mode selection means.

This objects and advantages of the present invention will become further apparent from the following detailed explanation.

BRIEF DESCRIPTION OF THE DRAWING(S)

DETAILED DESCRIPTION OF THE PREFERRED EMBODIMENT(S)

Embodiments of the present invention will be described hereinbelow with reference to the drawings.

Figure 1:
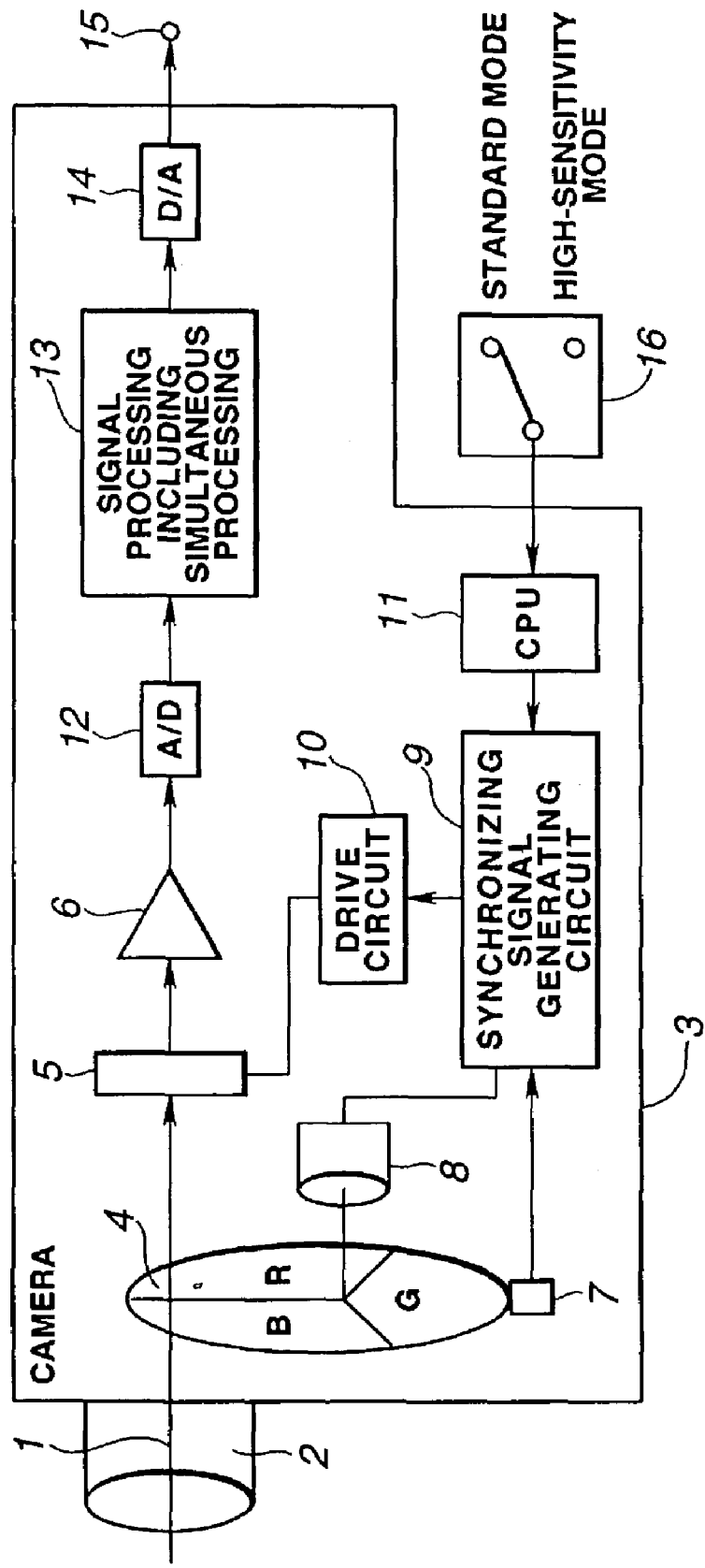
FIG. 1 is a block diagram showing a construction of a camera equipped with a solid-state image pick-up system according to a first embodiment of the present invention.

FIG. 1 is a block diagram showing a structure of a camera equipped with a solid-state image pick-up system according to a first embodiment of the present invention.

In the illustration, according to this embodiment a camera includes a camera lens 2 which is disposed on a front surface side of a camera body 3 to receive an incident light beam 1 from a subject or the like, and further includes an R, G, and B rotary filter 4 located in the rear of the camera lens 2. In the rear of this rotary filter 4 there is disposed a solid-state image pick-up device 5 which accepts the subject light separated into R, G, and B through the rotary filter 4.

An output signal from the solid-state image pick-up device 5 is amplified in a preamplifier 6 and further outputted through an A/D converter 12, a signal processing circuit 13 such as a simultaneously signal processing circuit, a D/A converter 14 and an output terminal 15 to an external monitor.

On the other hand, the camera is provided with a CPU 11 for taking the charge of control of the respective circuits of the whole camera in addition to a synchronizing signal generating circuit 9 for issuing a given synchronizing signal. This synchronizing signal generating circuit 9 undergoes the control of the CPU 11 and controls, on the basis of the produced synchronizing signal, a motor 8 for driving the rotary filter 4 and a drive circuit 10 for driving the solid-state image pick-up device 5.

Furthermore, on an outer surface of the camera body 3, there is set an image pick-up mode selection switch 16 which selects the image pick-up mode from a standard mode and a high-sensitivity mode and switches to the selected one, and an image pick-up mode signal due to the selection by the image pick-up mode selection switch 16 is inputted to the CPU 11. Whereupon, the rotary filter 4 and the solid-state image pick-up device 6 come under the control of the CPU 11 to be driven according to the image pick-up mode selected by the image pick-up mode selecting switch 16.

The rotation of the rotary filter 4 is detected by a photo-interrupter 7 disposed in the vicinity of the rotary filter 4, and the detection signal is inputted to the synchronizing signal generating circuit 9 to be used for the control of the rotation of the rotary filter 4. The drive circuit 10 is composed of a pulse drive circuit and a bias circuit for driving the solid-state image pick-up device 5.

Figure 2:
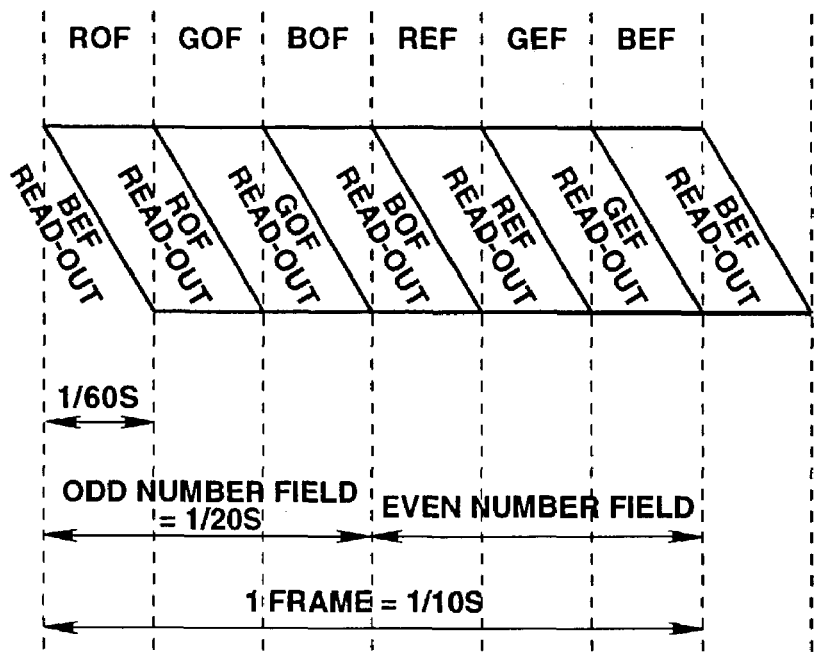
FIG. 2 is a time chart showing an operation of the camera where the image pick-up mode is set to be a standard mode, in the first embodiment.

Secondly, referring to FIGS. 2 and 3 a description will be made hereinbelow of an operation of the camera in this first embodiment thus arranged. FIG. 2 is a time chart in the case that the image pick-up mode is set to a standard mode (accumulation time of 1/60 second, two revolutions/frame), and FIG. 3 is a time chart in the case that the image pickup mode is set to a high-sensitivity mode (accumulation time of 1 second).

Figure 3:
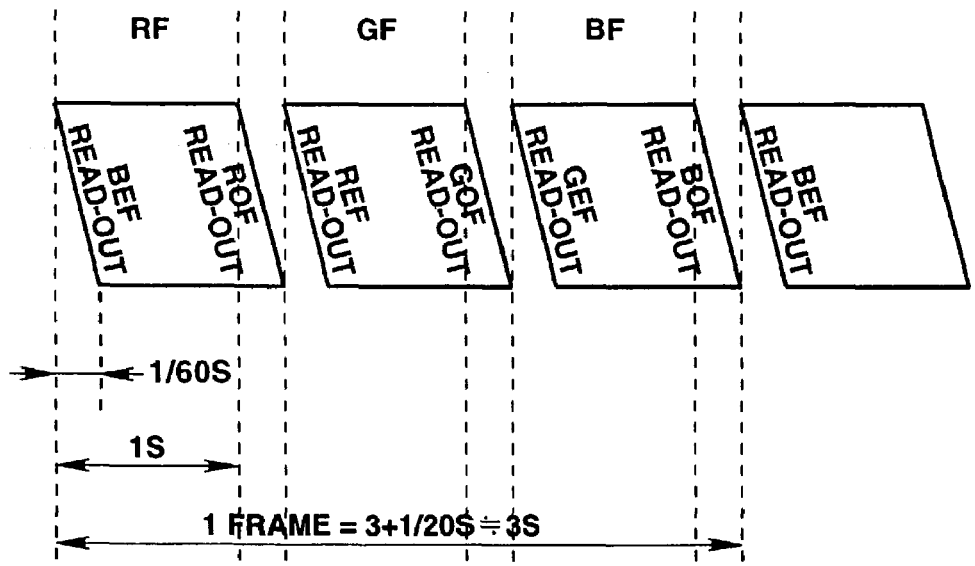
FIG. 3 is a time chart showing an operation of the camera where the image pick-up mode is set to be a high-sensitivity mode, in the first embodiment.

In FIGS. 2 and 3,

"ROF": odd number field of red (R)
"GOF": odd number field of green (G)
"BOF": odd number field of blue (B)
"REF": even number field of red (R)
"GEF": even number field of green (G)
"BEF": even number field of blue (B)
"RF": frame of red (R)
"GF": frame of green (G)
"BF": frame of blue (B)

In the case of the selection of the standard mode by the image pick-up mode selection switch 16, the mode of the synchronizing signal generating circuit 9 under the control of the CPU 11 changes, and as shown in FIG. 2 a set of field signals of R, G, and B are read out during one revolution of the rotary filter 4. More specifically, for a time period of 1/60 second corresponding to a field of each color a red (R) image light beam is picked up in the read (R) odd number field (ROF), and a green (G) image light beam is picked up in the green (G) odd number field (GOF) and at the same time a signal of the red (R) odd number field (ROF) is read out. In a similar way, simultaneously with the pick-up of a blue (B) image light beam in the blue (B) odd number field (BOF), a signal of the green (G) odd number field (GOF)) is read out.

When the read-out of the odd number fields of R, G, and B is completed in this way, a color picture is outputted from the output terminal 15 as a monitor output at 0.05 second/picture, thus reducing the color shift in the case of the dynamic picture. Further, this picture contributes only half the data of the entire element, and hence the data corresponding to the even number fields are interpolated on the basis of the signals from the odd number fields and then outputted as the monitor output.

Subsequently, a red (R) image light beam is picked up in the red (R) even number field (REF), while at the same time a signal of the blue (B) odd number field (BOF) is read out. In addition, concurrently with the pick-up of a green (G) image light beam in the green (G) even number field (GEF), a signal of the red (R) even number field (REF) is read out. Moreover, simultaneously with the pick-up of a blue (B) image light beam in the blue (B) even number field (BEF), a signal of the green (G) even number field (GEF) is read out. The read-out of a signal from the blue (B) even number field (BEF) is conducted when the next red (R) image light beam is picked up.

On the other hand, in the case of the selection of the high-sensitivity mode by the image pick-up mode selection switch 16, as shown in FIG. 3, R, G, and B frame signals are successively read out while making one revolution of the rotary filter 4. The frame accumulation time for each color is 1 second. First, a red (R) image light beam is picked up in the red (R) frame (RF), and after the completion of the accumulation, a signal of the red (R) odd number field (ROF) is read out for 1/60 second.

Following this, a signal of the red (R) even number field (REF) is read out for 1/60 second, and at the same time the accumulation of the green (G) of the green (G) frame (GF) starts. Further, after the completion of the accumulation for 1 second, a signal of the green (G) odd number field (GOF) is read out, and then a signal of the green (G) even number field (GEF) is read out for 1/60 second and at the same time the accumulation of the blue (B) of the blue (B) frame (BF) starts. After the completion of the accumulation for 1 second, a signal of the blue (B) odd number field (BOF) is read out, and then a signal of the blue (B) even number field (BEF) is read out for 1/60 second.

Although in this embodiment the accumulation time in the high-sensitivity mode is set to 1 second, the accumulation time is not limited to this time, but it is possible to arbitrarily determine the accumulation time. In addition, it is also appropriate to set a plurality of accumulation times.

As described above, in the normal mode the even number field signals and odd number field signals of R, G, and B are separately accumulated and then the corresponding signals are read out, and therefore a set of field signals of R, G, and B are obtainable. On the other hand, in the high-sensitivity mode the frame signals comprising the even number fields signals and odd number field signals of R, G, and B are accumulated at the same time and successively read out.

Thus, the camera according to the first embodiment can take the following effects.

In cases where the prior technical means in which the one fields are read during one revolution of the rotary filter and the one frames are read during two revolutions, with the standard mode where the accumulation time is the television rate (1/60), the monitor display of a picture corresponding to 20 fields/second is possible in the case of a dynamic picture, whereas the necessary accumulation time for one color results in being 6 seconds in taking in a picture corresponding to one field in a high-sensitivity mode that, for example, assumes 1 second.

On the other hand, in accordance with this first embodiment, in the case of the high-sensitivity mode, the frame signals of R, G, and B are successively read out while the rotary filter makes one revolution, and therefore the time necessary for obtaining one frame picture comes to approximately 3 seconds, and the reception or reading time can be shortened up to approximately half. Although in the high-sensitivity mode as shown in FIG. 3 the read-out time of 1/60 seconds is needed in addition to the accumulation time of 1 second, the accumulation time is originally long in the high-sensitivity mode and hence this time is ignorable.

Furthermore, a description will be taken hereinbelow of a second embodiment of the present invention.

Figure 4:
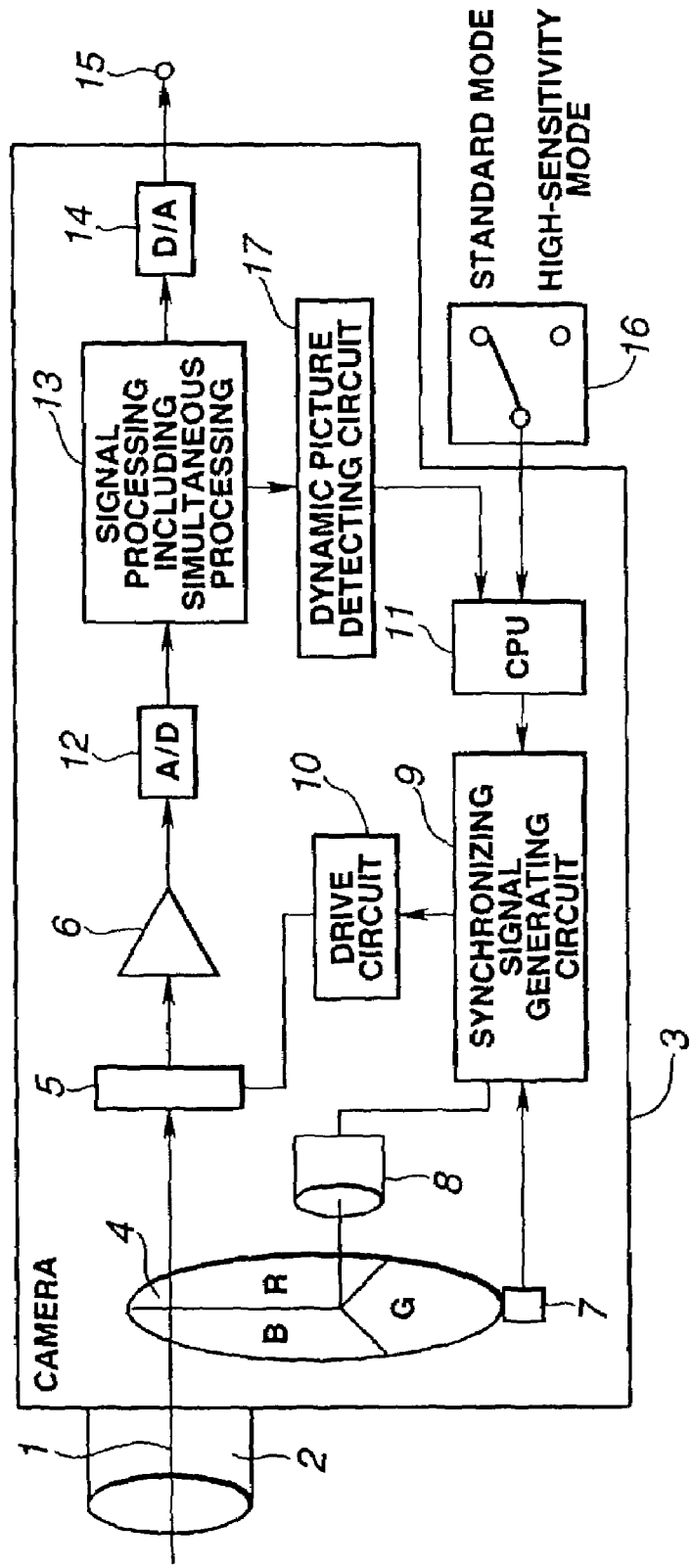
FIG. 4 is a block diagram showing a construction of a camera equipped with a solid-state image pick-up system according to a second embodiment of this invention.

FIG. 4 is a block diagram showing a structure of a camera having a solid-state image pick-up system according to the section embodiment of this invention. In the illustration, parts corresponding to those in the above-described first embodiment are marked with the same reference numerals, and the description thereof will be omitted for brevity.

Figure 5:
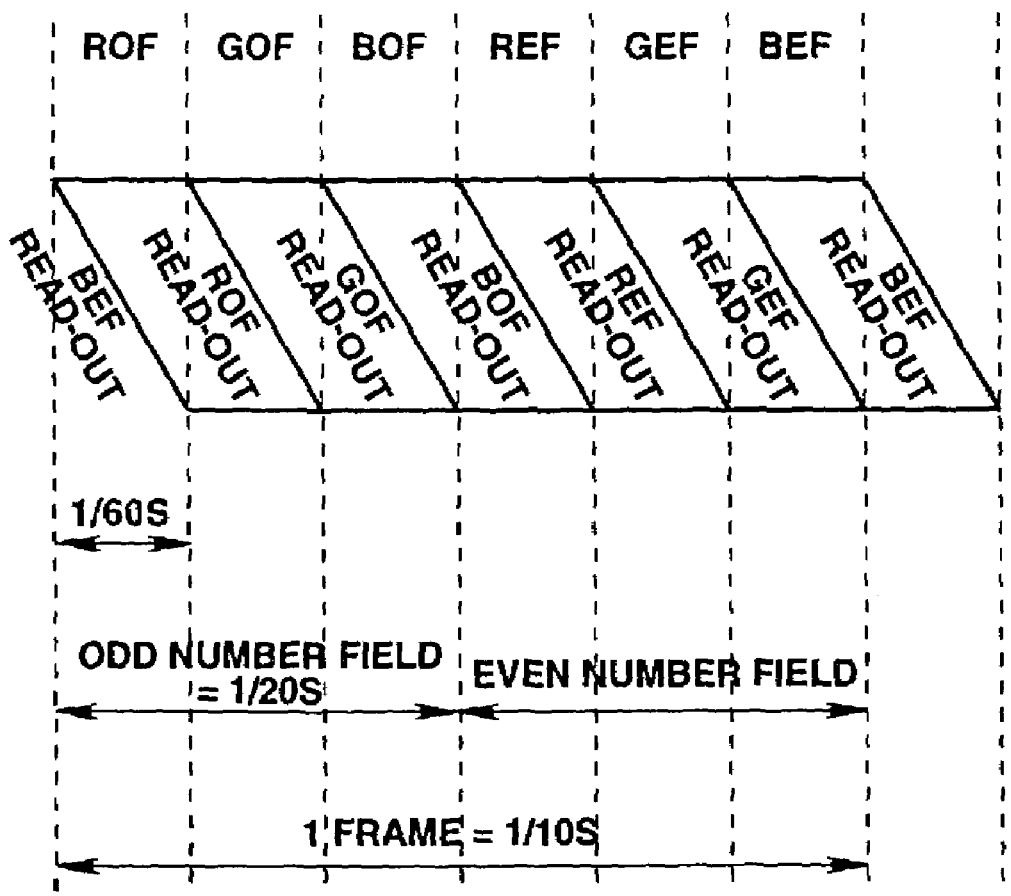
FIG. 5 is a time chart showing an operation of the camera where the image pick-up mode is set to be a standard mode, in the second embodiment.
Figure 6:
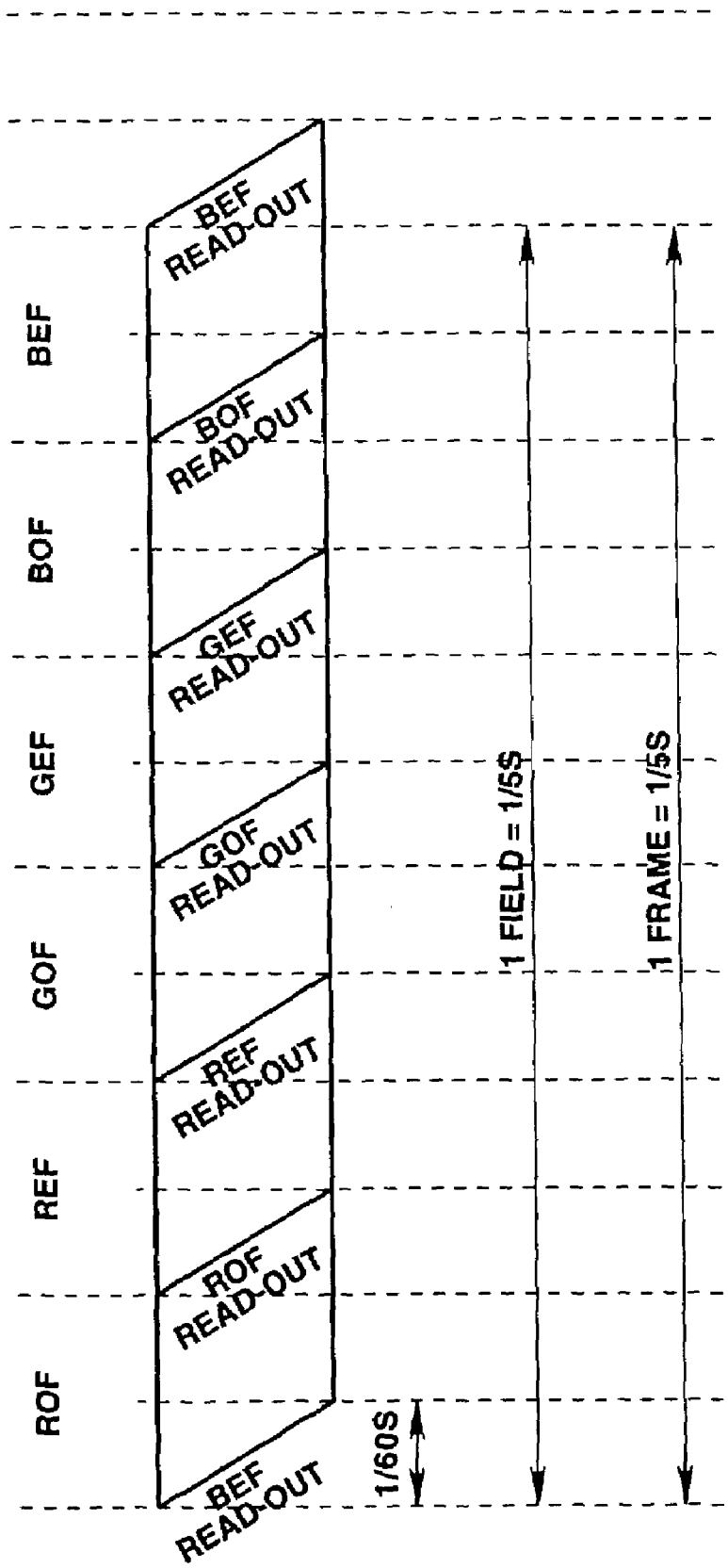
FIG. 6 is a time chart showing an operation of the camera in the case that the image pick-up mode is set to twice accumulation time and one revolution/frame with respect to the standard mode shown in FIG. 5, in the second embodiment.
Figure 7:
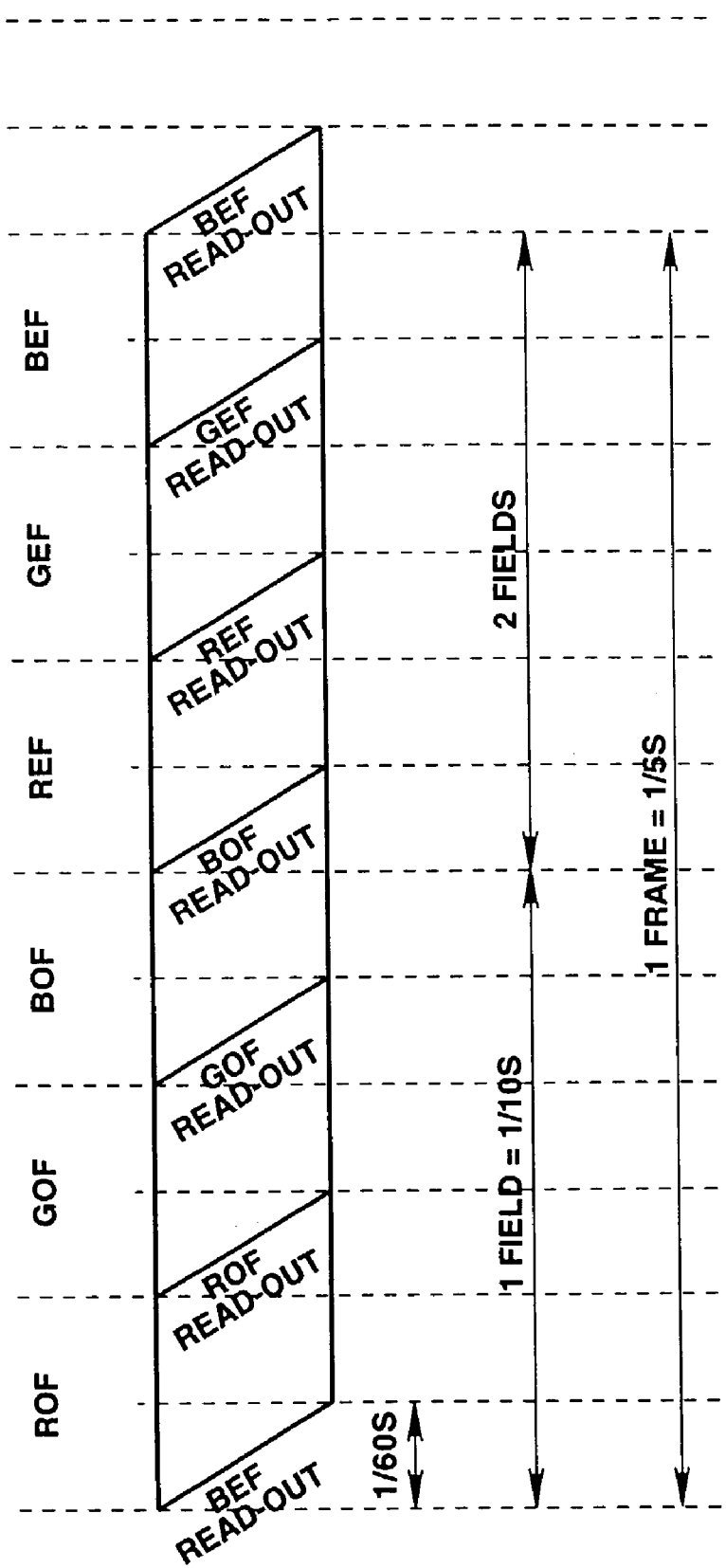
FIG. 7 is a time chart showing an operation of the camera in the case that the image pick-up mode is set to twice accumulation time and two revolutions/frame with respect to the standard mode shown in FIG. 5, in the second embodiment.

In addition, FIGS. 5 to 7 are time charts in the case that in the camera the image pick-up mode is set to be a standard mode. FIG. 5 is a time chart showing an operation of the camera in cases where the image pick-up mode assumes the standard mode (the accumulation time of $\frac{1}{60}$ second and two revolutions/frame), FIG. 6 is a time chart showing an operation of the camera in cases where the image pick-up mode is set to the double accumulation time and one revolution/frame as compared with those in the standard mode shown in FIG. 5, and FIG. 7 is a time chart showing an operation of the camera in cases where the image pick-up mode is set to the double accumulation time and two revolutions/frame as compared with those of the standard mode shown in FIG. 5. Moreover, in FIGS. 5 to 7, the reference marks "ROF", "GOF", "BOF", "REF", "GEF" and "BEF" are the same as those in FIG. 3, and the description thereof will be omitted.

As shown in FIG. 4, in addition to the structure of the first embodiment, the camera according to this embodiment has a dynamic picture detecting circuit 17 to detect the motion of a subject, that is, to check whether the subject image is a still picture or a dynamic picture, on the basis of the output of the signal processing circuit 13 such as a simultaneous signal processing circuit, and outputs the detection result to the CPU 11. In this embodiment, this dynamic picture detecting means 17 is composed of, for example, a dynamic picture detecting circuit using a well-known frame memory to detect the occurrence or no occurrence of the movement of the subject.

When in the dynamic picture detecting circuit 17 the decision is made on the basis of an image pick-up picture signal from the signal processing circuit 13 to that the inputted subject image is a still picture, the CPU 11 controls the respective circuits to lengthen the accumulation time. With the lengthened accumulation time, not only a subject with a low illuminance becomes observable, but also the betterment of the S/N ratio is possible even if the light quantity is proper. For example, in cases where the dynamic picture detecting circuit 17 makes a decision to the still picture, when as shown in FIG. 6 or 7 the accumulation time is doubled, the S/N ratio steps up by 3dB.

The dynamic picture detecting circuit 17 is based upon a known representative-point system exemplified by Japanese Unexamined Patent Publication No. 61-201581. In this technical means, a correlative calculation is made between the present frame picture information and the representative point picture information thinned and derived from the previous frame picture information to obtain the displacement with the maximum correlation.

Furthermore, when the subject moves in the case that the accumulation time is long in the high-sensitivity mode, the after-image appears, which makes it difficult to trace the subject. According to the camera of this embodiment, taking into consideration this situation, when the dynamic picture detecting circuit 17 makes a decision to that the subject picture is a dynamic picture, the shifting from the high-sensitivity mode to the standard mode immediately takes place and the subject is observable on the monitor at a high speed of approximately 20 fields/second.

A brief description will be taken hereinbelow of an operation of the camera according to this embodiment with reference to FIGS. 4 and 5.

The aforesaid dynamic picture detecting circuit 17 always detects the difference between the previous frame and the present frame in the subject signal outputted from the signal processing circuit 13. Further, the dynamic picture detecting circuit 17 makes a decision to that the subject image is a still picture when the difference between the previous frame and the present frame does not occur, and sends the result to the CPU 11. The CPU 11 receives the information form the dynamic picture detecting circuit 17 to execute control necessary for the still picture mode.

If the subject modes during this still picture mode, the dynamic picture detecting circuit 17 detects the difference between the previous frame and the present frame and immediately makes a decision as the dynamic picture. The CPU 11 accepts this information and outputs an instruction for switching from the still picture mode to the dynamic picture mode to the respective circuits, so that the shifting from the high-sensitivity mode to the standard mode takes place.

The camera of this second embodiment thus arranged can take the following effects.

As described above, according to this second embodiment, the dynamic picture detecting circuit 17 is provided and, in the case of a still picture, the accumulation time in the solid-state image pick-up device is lengthened even in the standard mode to enhance the S/N ratio. For instance, in the case of the accumulation time doubled, the improvement is made so that.

Moreover, in the case of the high-sensitivity mode, for example, when the accumulation time for one color is 1 second, because of the movement of the subject, the color shifting quantity increases as compared with the case of a short accumulation time. For this reason, in this embodiment the above-mentioned dynamic picture detecting means 17 is provided, and in the case of shifting from the still picture to the dynamic picture, the standard mode is automatically taken which has a short accumulation time ($\frac{1}{60}$ second) in the solid-state image pick-up device, thus lessening the color drift and allowing the follow-up of the movement of the subject on the monitor screen.

A description will be made hereinbelow of a third embodiment of the present invention.

Figure 8:
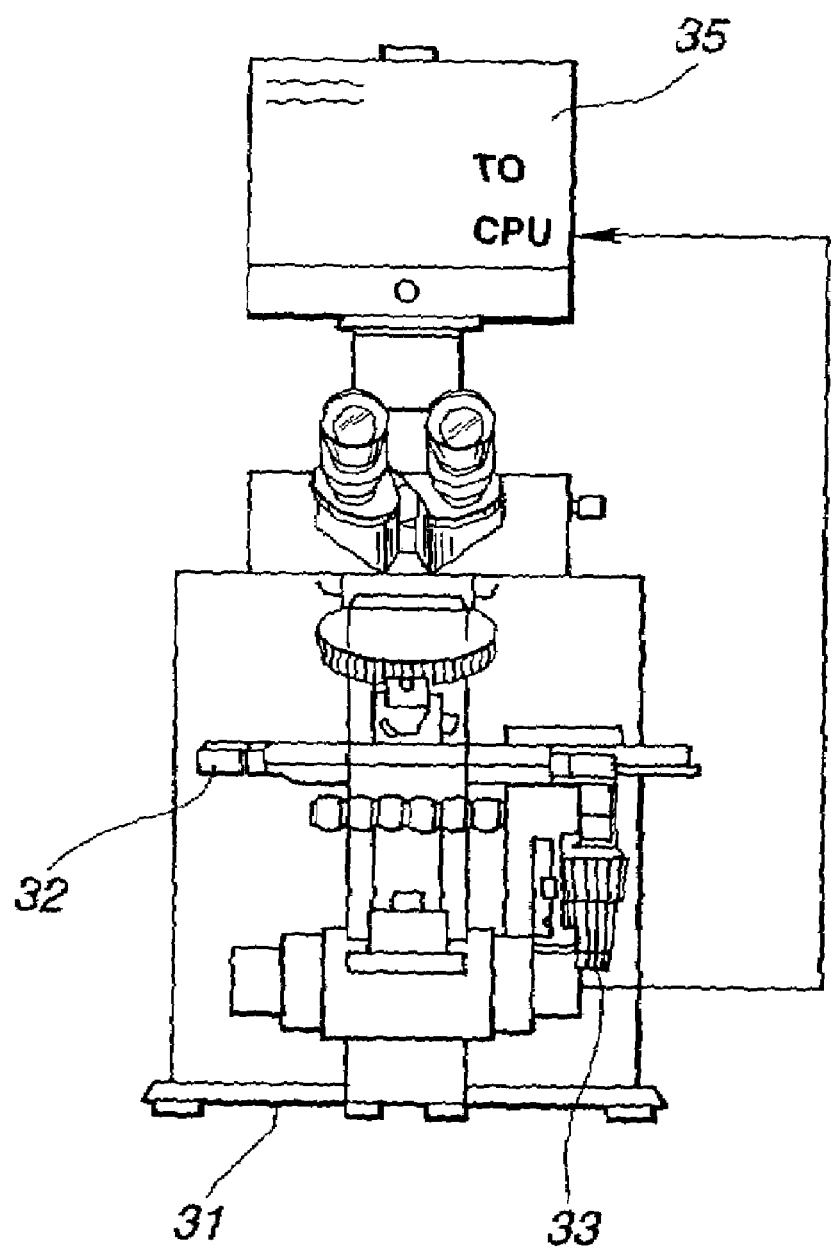
FIG. 8 is a front elevational view showing a principal portion of a microscope in a third embodiment of this invention.

FIG. 8 is a front elevational view showing a principal portion of a microscope constituting a third embodiment of this invention. In the illustration, numerals 31, 35 represent a microscope body and an image pick-up camera, respectively.

In the camera according to the second embodiment in which this invention is applied to a common camera with a solid-state image pick-up device, as mentioned before the dynamic picture detecting circuit 17 comprises a dynamic picture detecting circuit using a well-known frame memory to detect the presence or absence of the movement of the subject for distinguishing between a dynamic picture and a still picture.

On the other hand, this third embodiment relates to a microscope or the like to which this invention is applied. As illustrated in FIG. 8, in the case of a microscope, the movement of an image corresponds to the movement of a stage 32, and therefore a stage sensor is provided or a touch sensor or the like is attached to a stage moving handle 33 so that the movement of a subject is made to be detectable. The detection signal from this sensor is inputted to a control circuit (not shown) built in the camera designated at numeral 35, while this control circuit uses this sensor detection signal as a control signal for switching between a standard mode and a high-sensitivity mode.

This embodiment can also exert the same effects as those of the above-described second embodiment.

That is, a prior dynamic picture detecting circuit uses a frame memory to obtain an interframe difference to make a decision to a dynamic picture or a still picture. In this case, if the subject is extremely dark or if no difference in brightness occurs, the interframe difference does not occur, with the result that the decision is made to a still picture even if actually it is a dynamic picture, and the switching to the standard mode becomes impossible.

On the other hand, since according to this embodiment the decision between the dynamic picture and the still picture depends upon the movement of the stage of the microscope, the dynamic picture/still picture decision is possible irrespective of the condition of subject, so that sure switching to the standard mode becomes feasible.

Still further, a description will be made hereinbelow of a fourth embodiment of the present invention.

Figure 9:
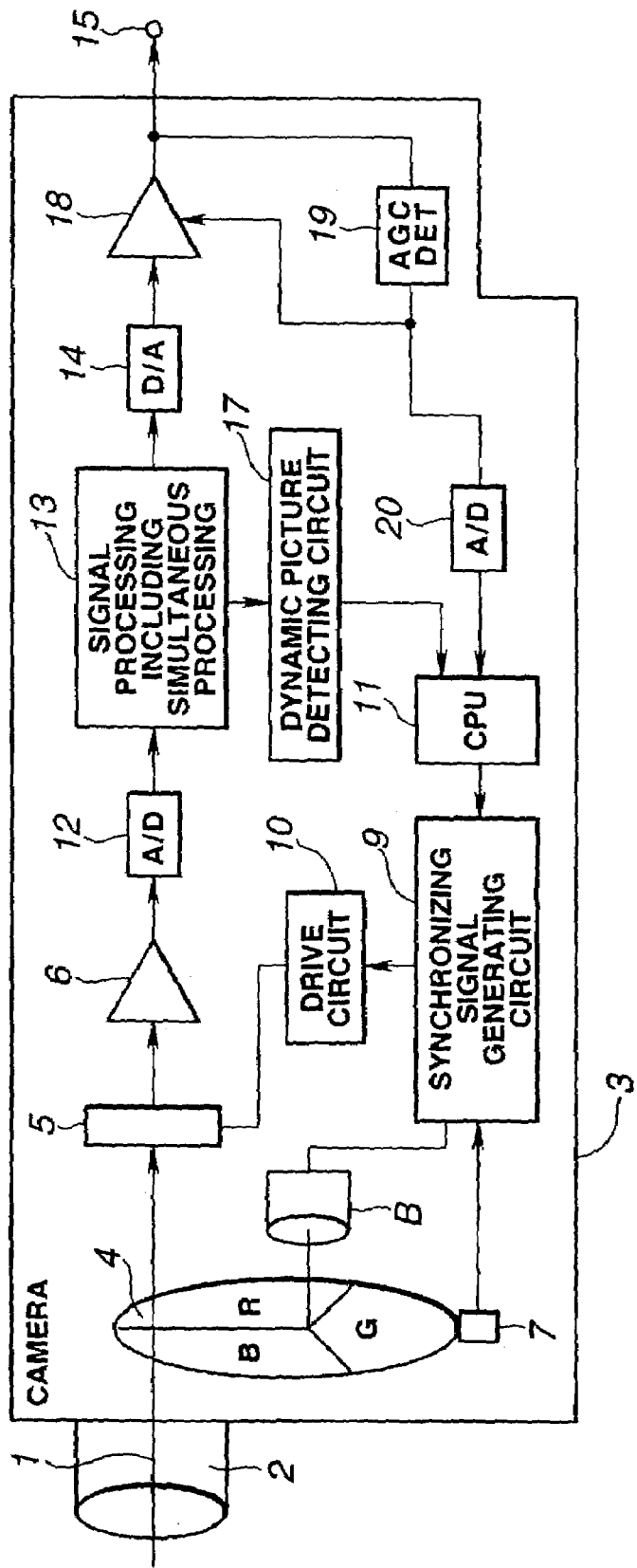
FIG. 9 is a block diagram showing a construction of a camera equipped with a solid-state image pick-up system according to a fourth embodiment of this invention.

FIG. 9 is a block diagram showing a structure of a camera with a solid-state image pick-up system according to a fourth embodiment of this invention. In the illustration, parts corresponding to those in the above-described first and second embodiments are marked with the same numerals, and a description thereof will be omitted here.

In the camera according to the fourth embodiment, an automatic gain control circuit (AGC) is provided in addition to the structure of the above-mentioned second embodiment so that the accumulation time at the case of the still picture is automatically changed to maintain the signal level at a given value, with the result that the accumulation time is lengthened in accordance with the signal level to improve the S/N ratio.

That is, as shown in FIG. 9 an AGC amplifier 18 and an AGC detector circuit (AGCDET) 19 constituting an automatic gain control circuit are placed after a D/A converter 14, and the output of the AGC amplifier 18 is detected in the AGC detector circuit (AGCDET) 19 and then sent through an A/D converter 20 to a CPU 11, so that the accumulation time at the still picture is automatically controlled to make the signal level assume a given value. Further, as mentioned before, the accumulation time can be lengthened in accordance with the signal level, thus improving the S/N ratio.

A table 1 shows the relationship among the mode, the accumulation time based on the light quantity (input signal level), and the AGC.

TABLE 1

| Mode | Light Quantity | Accumulation Time | AGC Gain |
|---|---|---|---|
| Dynamic Picture | Small | 1/60 s | Large |
|  | Large | 1/60 s | Small |
| Still Picture | Small | Long | Small |
|  | Large | Short (above 1/60 s) | Small |

As shown in the Table 1, in the dynamic picture mode, the accumulation time is constant to be the standard television rate (1/60s), and the AGC gain is increased in the case of a dark subject, whereas it is decreased in the case of a light subject, with the result that the output level is made to be constant within the gain range of the AGC amplifier.

On the other hand, in the case of the still picture mode, the accumulation time is lengthened until the moment immediately before the saturation of the solid-state image pick-up device regardless of the incident light quantity to raise the solid-state image pick-up output level, while the AGC gain is decreased by a value corresponding thereto, so that in the camera the S/N ratio improves.

Thus, the camera according to this fourth embodiment can exert the following effects. That is, the dynamic picture/still picture is detected, and in the still picture mode the automatic gain control circuit is additionally used without changing the fixed accumulation time so that in the still picture mode the accumulation time in the solid-state image pick-up device is lengthened till the moment immediately before the solid-state image pick-up device overflows with the electric charge while the circuit side gain is decreased by the automatic gain control circuit by a value corresponding to the increase in the signal level. In consequence, the S/N ratio can step up in accordance with the input signal level.

Moreover, a description will be made hereinbelow of a fifth embodiment of the present invention.

Figure 10:
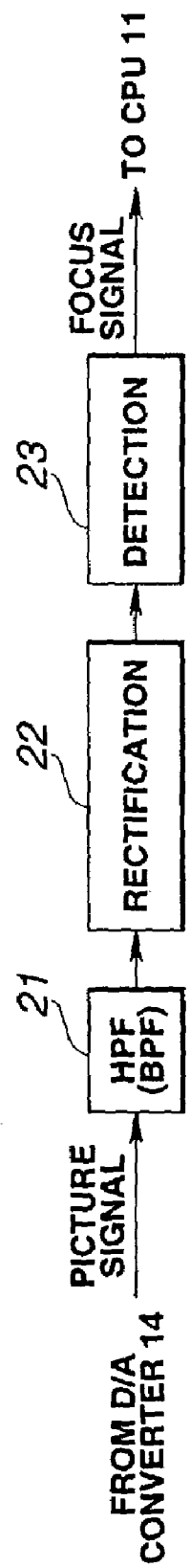
FIG. 10 is a block diagram of a principal portion, showing a focus detector circuit section in a camera equipped with a solid-state image pick-up system according to a fifth embodiment of this invention.

This fifth embodiment relates to a camera having a focus detector circuit in addition to the arrangement of the cameras with the solid-state image pick-up device according to the above-described first, second and fourth embodiments, and FIG. 10 shows the focus detector circuit section in this embodiment.

In general, in the equipment having a focusing mechanism, the speed is required to be over 3 frames/second for easy manual focusing. This fifth embodiment has been developed in order to eliminate this problem. As shown in FIG. 10 a focus detector circuit is used, in the case of a high-sensitivity mode, if the decision is made to an out-of-focus condition, the camera shifts to a standard mode or a high-sensitivity mode above 3 frames/second, thus facilitating the focusing.

A description will be taken hereinbelow of the focus detector circuit shown in FIG. 10.

This focus detector circuit is of a type using a well-known field memory and utilizing a picture signal. The description of the circuit arrangement will be made along the flows of the signals.

Of the picture signals outputted from the abovementioned D/A converter (see FIGS. 1 and 4), a green channel picture signal is filtered through a high-pass filter (HPF) or a band-pass filter (BPF) 21 and then rectified through a rectifier 22, and subsequently a high-frequency component within a field is detected by a detector circuit 23. Further, the output of the detector circuit 23 is inputted as a focus signal to the CPU 11. Incidentally, the detector circuit 23 is based upon an average-value detection, a peak detection, or the like.

Figure 11:
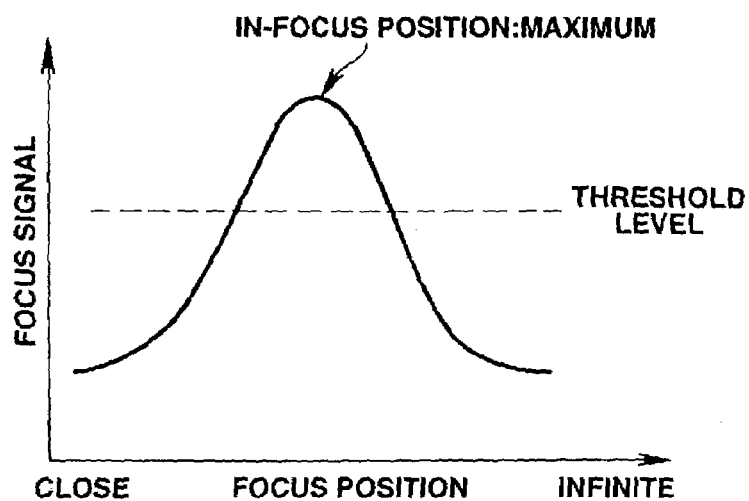
FIG. 11 is a diagrammatic view showing the relationship between a focal signal and a focus position in the focus detector circuit section of the camera equipped with the solid-state image pick-up system according to the fifth embodiment.

FIG. 11 is a graphic diagram showing the relationship between the aforesaid focus signal and a focus position.

As illustrated, the focus signal reaches the maximum value at the in-focus position. Since the height and configuration of the mountain-like curve vary at very subject, when the focus signal comes to a threshold value including a given high-frequency component, the decision to the in-focus state is made. Besides the abovementioned methods, among the focus detecting methods there are a distance measuring method using an infrared light beam, a phase difference detecting method using a line sensor, and so on, and every method is acceptable.

The camera according to the fifth embodiment can display the following effects. That is, in a prior camera, in the case of the high-sensitivity mode, for example in the case that the accumulation time for one color is 1 second, difficulty is actually experienced to accomplish the in-focus condition, and for the focusing adjustment, the switching to the standard mode is necessary in the middle of the focusing operation.

In the camera according to the fifth embodiment, a focus detecting means (focus detector circuit) of an image pick-up optical system is provided so that the shifting from the high-sensitivity mode to the standard mode automatically takes place, thus improving the controllability.

Furthermore, a description will be made hereinbelow of a sixth embodiment of the present invention.

Figure 12:
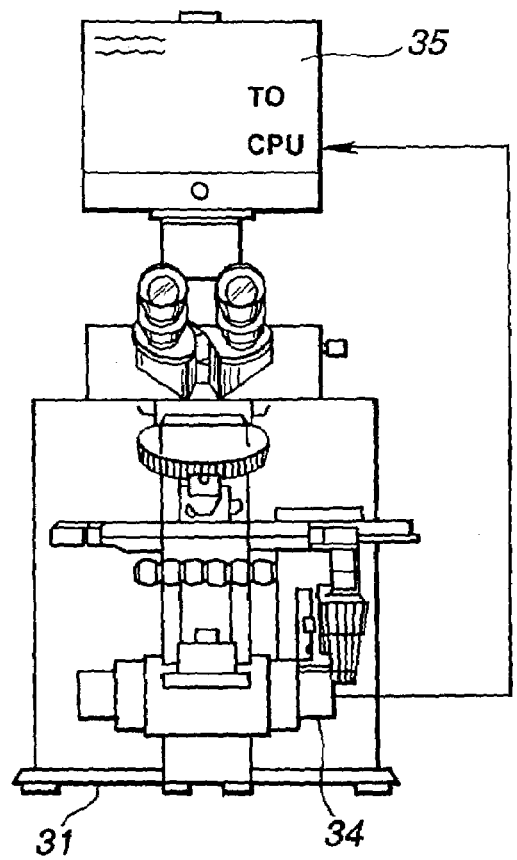
FIG. 12 is a front elevational view showing a principal portion of a microscope in a sixth embodiment of this invention.

FIG. 12 is a front elevational view showing a principal portion of a microscope according to the sixth embodiment. In the illustration, the numerals 31, 35 denote a microscope body and an image pick-up camera, respectively.

In the microscope according to this embodiment, a sensor is attached to a quasi-focusing handle 34 for the focus adjustment and an output signal of the sensor is used as a control signal so that the focus adjustment is made in a control circuit incorporated in the camera 35. In addition, on the basis of the control signal from the sensor the mode is switched to a standard mode or a high-sensitivity mode over 3 frames/second to facilitate the focusing operation. Thus, this embodiment can exert the same effects as those of the above-described fifth embodiment.

This method is applicable to a camera in which the focusing is made on the basis of a control signal from a focus ring, and in this case the control signal allows the shifting from a standard mode or a high-sensitivity mode above 3 frames/second in a similar way, thus realizing an easy focusing operation.

Accordingly, the microscope according to the sixth embodiment can exhibit the following effects. That is, even in the case of a prior microscope, in the high-sensitivity mode, for example in the case of the accumulation time for one color being 1 second, the focusing becomes virtually impossible, and for the focus adjustment it is necessary that the switching to the standard mode is made once.

On the other hand, in the case of the microscope according to the sixth embodiment, on the basis of the fact that a focus adjusting section is rotated for the focus adjustment, a sensor is provided which reacts when a person touches or rotates this adjusting section, and the switching to the standard mode is made during the focus adjustment. Thus, even in cases where the subject is extremely dark or in cases where no difference in brightness occurs and difficulty is encountered to make a decision on the in-focus condition through an in-focus detecting means based upon a focus detection method or the like, the decision can be made on the fact of conducting the focus adjustment so that the switching to the standard mode is practicable, thus improving the controllability.

Still further, a description will be made hereinbelow of a seventh embodiment of the present invention.

A feature of this seventh embodiment is the employment of a CMD serving as a solid-state image pick-up device.

Figure 13:
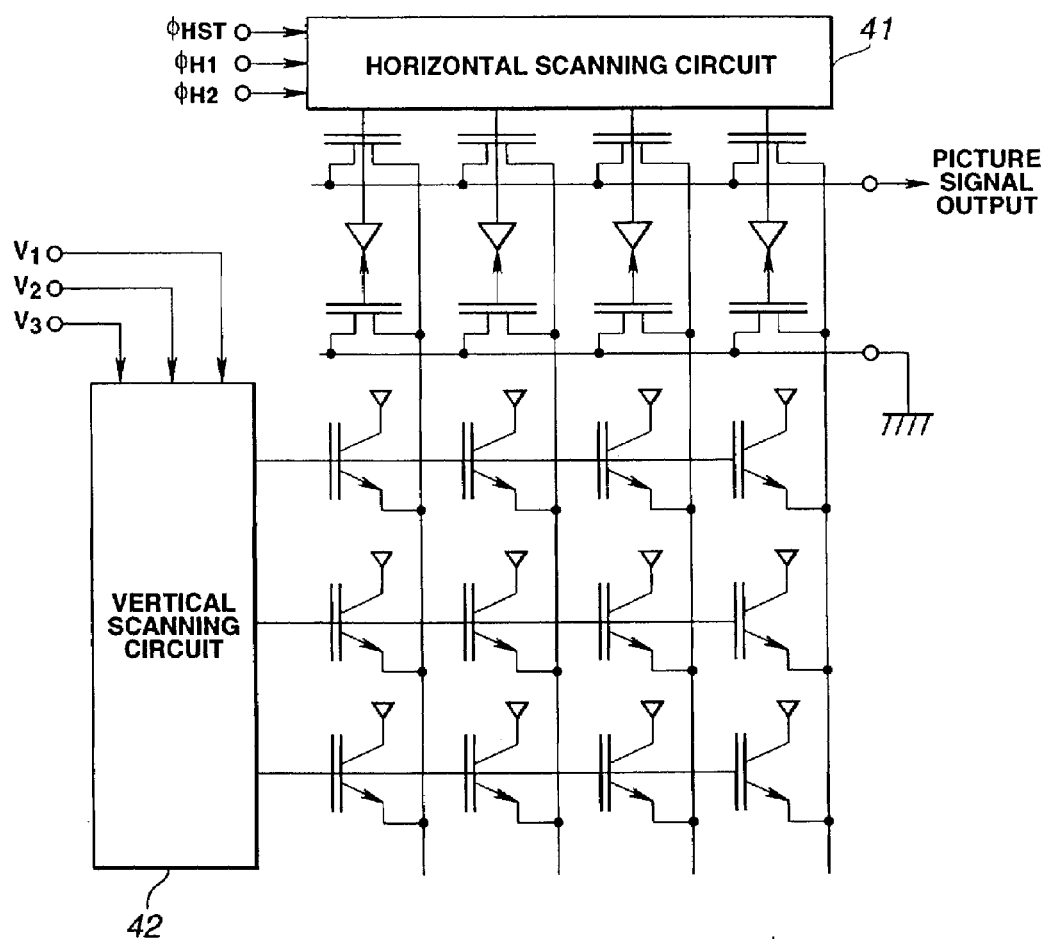
FIG. 13 is an illustration of a circuit being one example of arrangements of a CMD of a camera equipped with a solid-state image pick-up system according to a seventh embodiment of this invention.
Figure 14:
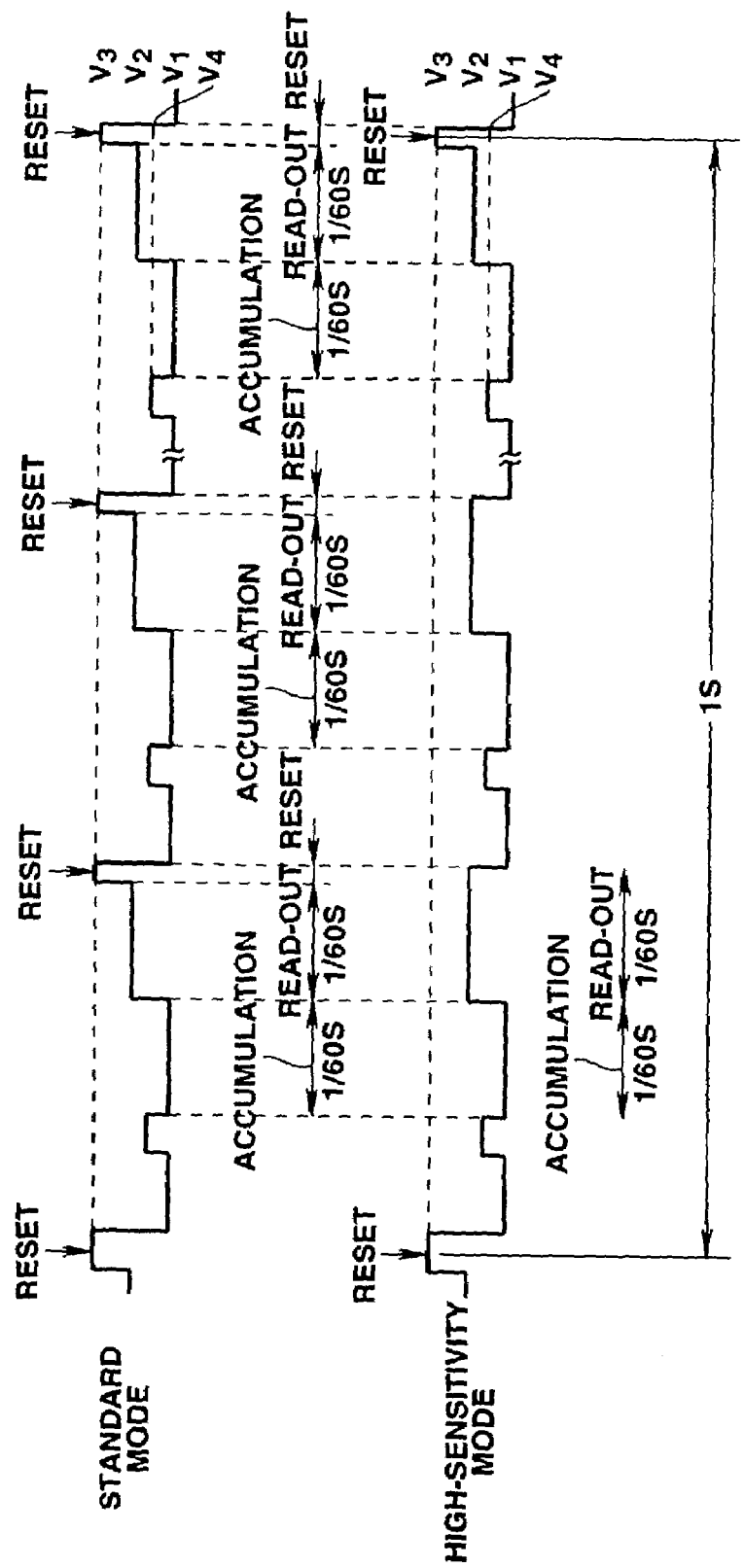
FIG. 14 is a time chart showing one example of CMD pulse timings in the camera equipped with the solid-state image pick-up system according to the seventh embodiment.

FIG. 13 is an explanatory illustration of one example of arrangements of the CMD, and FIG. 14 is a time chart showing on example of pulse timings in the CMD.

In general, in a charge transfer type solid-state image pick-up device such as a CCD, charges subjected to a photoelectric conversion are transferred to output pixel data, while in an image pick-up device such as the CMD (Charge Modulation Device) which performs the amplification in a pixel in a circuit-like way the gate electric potential is maintained to be the accumulated electric potential of the positive hole so that the pixel data is read out plural times.

In this seventh embodiment, in the standard mode it is read out every 1/60 second and the reset is made immediately after the read-out, while in the high-sensitivity mode it is read out every 1/60 second and the reset is made after the completion of the accumulation, for example, 1 second later. Whereupon, it is possible to output pixel data with a long accumulation time without the change of the read-out rate.

As shown in FIG. 13, the CMD employed in this embodiment is an X-Y address type image pick-up device in which the gate section of each pixel is connected to a vertical scanning circuit 42 while the source section thereof is coupled to a horizontal scanning circuit 41 for current reading. Further, to the vertical scanning circuit 42, there are given three-valued pules: an accumulation potential V1, a read-out potential V2 and a reset potential V3, which are respectively applied to the gate of each pixel at given timings.

In FIG. 14, in the upper section illustrating the standard mode and in the lower section illustrating the high-sensitivity mode, there are shown timings of four-valued pulses (an accumulation potential V1, a read-out potential V2, a reset potential V3, a potential V4 for discharging excessive electric charges) to be given to the aforesaid vertical scanning circuit 42. In response to the application of the accumulation voltage V1, the current between the source and the drain is cut off in a manner that a strong negative charge is given to the gate, with the result that it gets into an accumulation condition. In addition, in response to the application of the read-out potential V2, the barrier between the source and the drain disappears and a signal current flows in accordance with the number of positive holes accumulated right under the gate. Moreover, in response to the application of the reset potential V3, a barrier built by the source-drain potential in the substrate direction disappears, so that the positive hole is discharged in the substrate direction. Besides, the potential V4 is for the purpose of discharging extra charges, and the extra charge discharge due to the potential V4 and the charge accumulation due to the potential V1 are repeatedly done until again reaching the read-out potential V2.

Still further, the change of the accumulation time is possible through the control of the reset potential V3.

Accordingly, this seventh embodiment exhibits the following effects. That is, in the case of employing a charge transfer type solid-state image pick-up device such as a CCD, it is necessary that the transfer rate is changed for changing the accumulation time, and hence a problem arises in that the circuit scale of a timing generator or the like becomes large.

In the camera according to the seventh embodiment, a solid-state image pick-up device for performing the amplification in a pixel of the CMD or the like as well as a circuit is used, and by making the use of the feature of this device, that is, the fact that the pixel data is not broken irrespective of the number of times of read-out as long as the reset is not made, the read-out is always conducted at the standard television rate of 1/60 second regardless of the accumulation time, and the change of the accumulation time becomes possible through the control of only the reset pulse. As a result, the circuit can be simplified as compared with the case of using the CCD.

Moreover, a description will be made hereinbelow of an eighth embodiment of the present invention.

Figure 15:
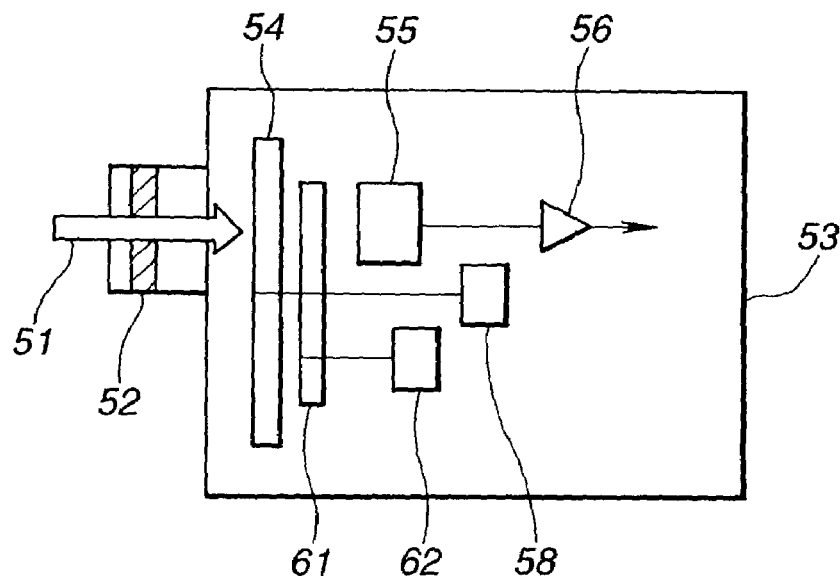
FIG. 15 is a block diagram showing a structure of a principal portion, viewed from a side direction, of a camera equipped with a solid-state image pick-up system according to an eighth embodiment of this invention.
Figure 16:
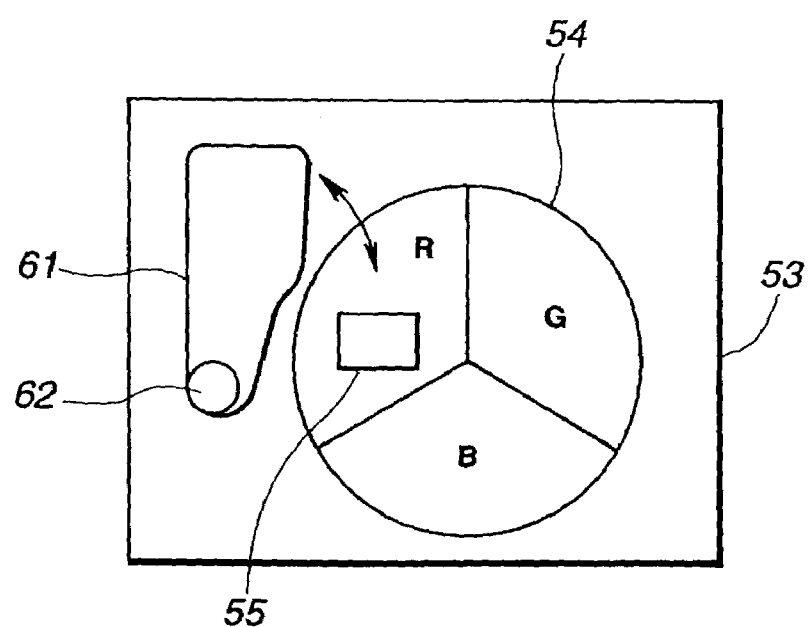
FIG. 16 is an illustration of a structure of a principal portion, viewed from a rear direction, of the camera equipped with the solid-state image pick-up system according to the eighth embodiment.

FIG. 15 is a block diagram showing an arrangement of a principal portion, viewed from a side direction, of a camera with a solid-state image pick-up device according to an eighth embodiment of this invention, and FIG. 16 is an illustration of the structure of the principal portion of the same camera, viewed from a rear side direction.

As shown in FIGS. 15 and 16, in the camera according to this embodiment, on the front side of the camera body 53 there is disposed a camera lens 52 which receives an incident light beam 51 such as a subject light beam, and in the rear of the camera lens 52 there is located an R, G, and B rotary filter 54 (see FIG. 16). Further, a mechanical shutter 61 is placed in the rear of this rotary filter 54 and a solid-state image pick-up device 55 is situated in the rear of the mechanical shutter 61, so that the subject light beam separated through the rotary filter 54 into R, G, and B is incident thereon through the mechanical shutter 61.

The output signal of the solid-state image pick-up device 55 is amplified in a preamplifier 56 and passes through an A/D converter, a signal processing circuit such as a simultaneously processing circuit and a D/A converter (not shown but similar to those in the above-described first embodiment), before being outputted from an output terminal to an external monitor.

Furthermore, the rotary filter 54 is driven by a rotary filter drive motor 58 whose drive is controlled by a control section, not shown, while the mechanical shutter 61 is driven by a shutter drive motor 62 which is drivecontrolled by a control section, not shown.

As described above, in the camera according to this embodiment, the mechanical shutter 61 is interposed between the solid-state image pick-up device 55 and the rotary filter 54. The releasing time period of this mechanical shutter 61 corresponds to the exposure time of the solid-state image pick-up device 55, and when the mechanical shutter 61 comes into the closed condition (an intercepted state), the read-out from the solid-state image pick-up device 55 starts.

Figure 17:
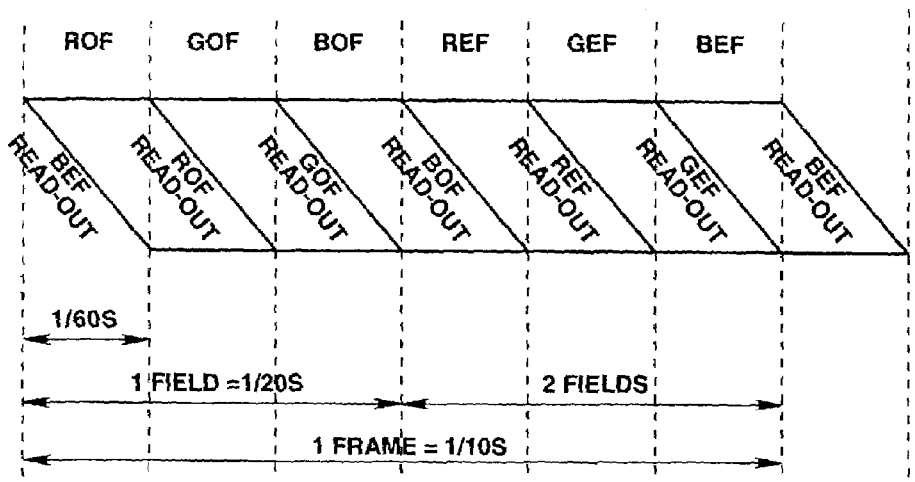
FIG. 17 is a time chart showing an operation of the camera in the case that the image pick-up mode is set to a standard mode, in the eighth embodiment.
Figure 18:
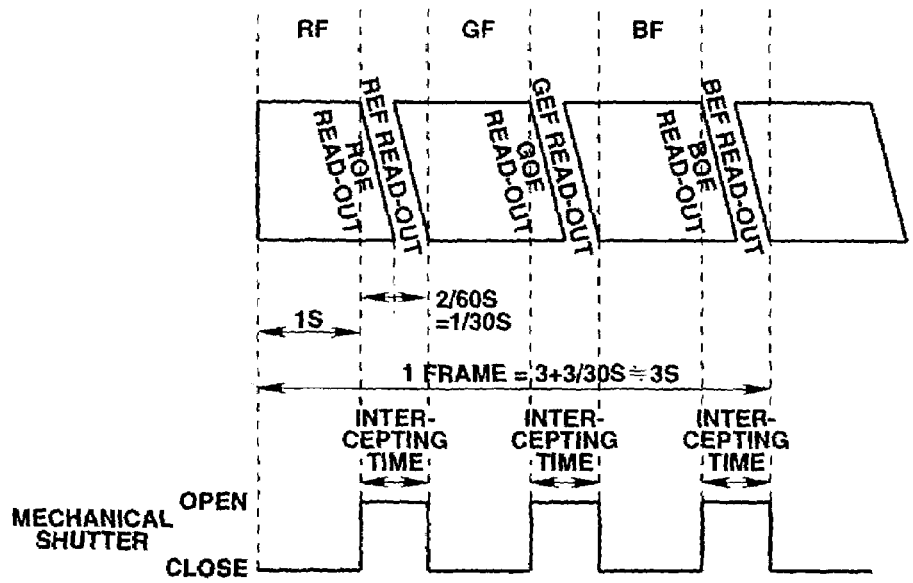
FIG. 18 is a time chart showing an operation of the camera in the case that the image pick-up mode is set to a high-sensitivity mode, in the eighth embodiment.

Referring to FIGS. 17 and 18 a description will be taken hereinbelow of an operation of the camera with the mechanical shutter 61 according to this eighth embodiment. FIG. 17 is a time chart showing an operation of the same camera in the case that the image pick-up mode is set to be the standard mode (accumulation time is 1/60 second, and the mechanical shutter is always in the open condition), while FIG. 18 is a time chart showing an operation of the same camera in the case that the image pick-up mode is set to be the high-sensitivity mode (accumulation time is 1 second). In FIGS. 17 and 18, the respective reference marks "ROF", "GOF", "BOF", "REF", "GEF", "BEF", "RF", "GF" and "BF" are the same as those in FIGS. 2 and 3, and the description thereof will be omitted.

As shown in FIG. 3, in the high-sensitivity mode in the above-described first embodiment, after the completion of the accumulation of the red (R) the read-out is made in the order of the odd number field and the even number fields, and therefore in the solid-state image pick-up device the red (R) is further accumulated during the readout from the odd number field and the accumulation time for the even number field becomes longer by 1/60 second as compared with the odd number field. For example, in the case that the accumulation time is 1 second, it becomes 1.7%.

FIG. 18 shows the high-sensitivity mode in the camera with the mechanical shutter 61 according to this eighth embodiment, and after the end of the accumulation time in the solid-state image pick-up device 55, the mechanical shutter 61 gets into the closed state the odd number field and the even number field are successively subjected to the read-out operation. In this case, the accumulation times for the odd number field and the even number field are equal to each other.

The camera according to the eighth embodiment can exhibit the following effects. That is, in the case of the high-sensitivity mode, the read-out time is shorter than the accumulation time, and hence, even if the odd number field and the even number field are consecutively read out, it makes almost no difference in output level between the odd number field and the even number field. However, strictly, assuming that the accumulation time for one color in the high-sensitivity mode is 1 second, the accumulation time of the odd number field read out previously becomes "1.000 second" while the accumulation time of the even number field read out later comes to "1.017 second", a difference therebetween occurs.

Taking this fact into consideration, in the camera according to the eighth embodiment the mechanical shutter is provided in addition to the arrangement of the camera according to the first embodiment, and in the case of the high-sensitivity mode, the light is shut out by the mechanical shutter 61 after the exposure and the read-out of the pixel data is done while the mechanical shutter 61 is in the closed state, which can solve the problem with the occurrence of the difference in output level between the odd number field and the even number field.

Furthermore, a description will be made hereinbelow of a ninth embodiment of the present invention.

In a camera with a solid-state image pick-up device according to this ninth embodiment, as a solid-state image pickup device there is employed a solid-state image pickup device such as an interline CCD which reads out line by line, and further as well as in the above-described eighth embodiment there is provided a mechanical shutter. The other structure is the same as that of the first or eighth embodiment and hence the description thereof will be omitted.

In the case of the interline CCD, because of reading out line by line, if the accumulation time is lengthened, the transfer time is required to be equal thereto. Consequently, with a long-term exposure, the read-out time becomes longer. In addition, there is a possibility that the subject varies between the beginning and end constituting one scene.

Taking this point into consideration, this ninth embodiment is provided with a mechanical shutter similar to that in the eighth embodiment, and the all pixels are read out in the standard television mode while the mechanical shutter is in the closed state. That is, after a long-term exposure, for example after the exposure for 1 second, the light intercept is performed with the mechanical shutter, and in the meantime all the pixels are read out in the standard mode.

Thus, the camera according to this ninth embodiment can read all the pixels out at the same timing as that in the high-sensitivity mode in the first and eighth embodiments (see FIGS. 3 and 18).

Still further, a description will be made hereinbelow of a tenth embodiment of the present invention.

Figure 19:
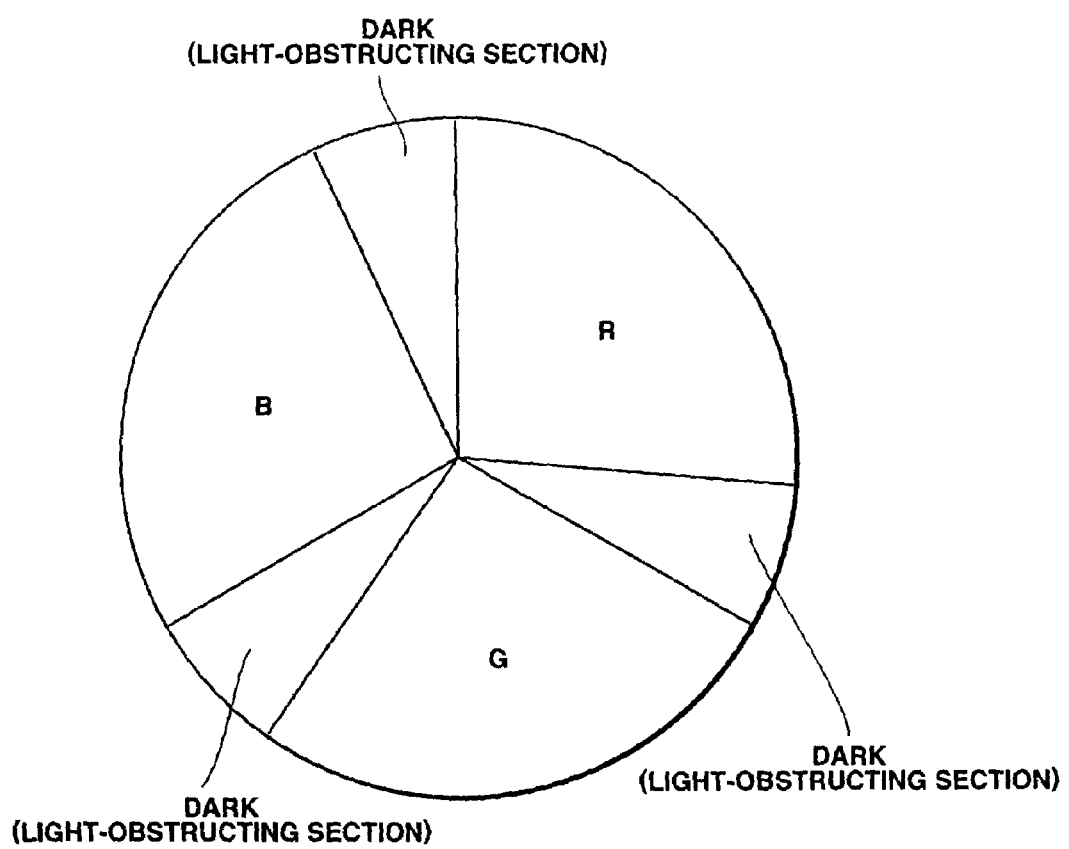
FIG. 19 is a front elevational view showing a rotary filter in a camera equipped with a solid-state image pickup system according to a tenth embodiment of this invention.

FIG. 19 is a front elevational view showing a rotary filter of a camera according to the tenth embodiment.

The feature of the camera according to the tenth embodiment is that as illustrated a light-obstructing section (DARK) is provided among R, G, and B color sections in a disc-like rotary filter. The other structure and operation are the same as those in the above-described first embodiment, and the detailed description will be omitted here.

In this embodiment, in terms of the above-mentioned rotary filter, after for example the red data is accumulated for 1 second through the red (R) filter, all the pixel data is read out at the light-obstructing section. Subsequently, the green data is accumulated for 1 second through the green (G) filter and then all the pixel data is read out at the light-obstructing section. Moreover, the flue data is accumulated for 1 second through the blue (B) filter and all the pixel data is read out at the light-obstructing section. With the operation repeated, a similar read-out time is achievable without the use of the mechanical shutter and peripheral parts in the above-described eighth embodiment.

Moreover, a description will be made hereinbelow of an eleventh embodiment of the present invention.

A camera with a solid-state image pick-up device according to this eleventh embodiment employs a well-known liquid crystal shutter in place of the mechanical shutter in the above-described eighth and ninth embodiments, and the operation thereof is the same as those in the eighth and ninth embodiments and hence the description will be omitted here.

The eleventh embodiment can exhibit the same effects as those in the eighth embodiment without the use of the motor, the light-obstructing plate and others dedicated to the camera with the mechanical shutter.

Furthermore, a description will be made hereinbelow of a twelfth embodiment of the present invention.

Figure 20:
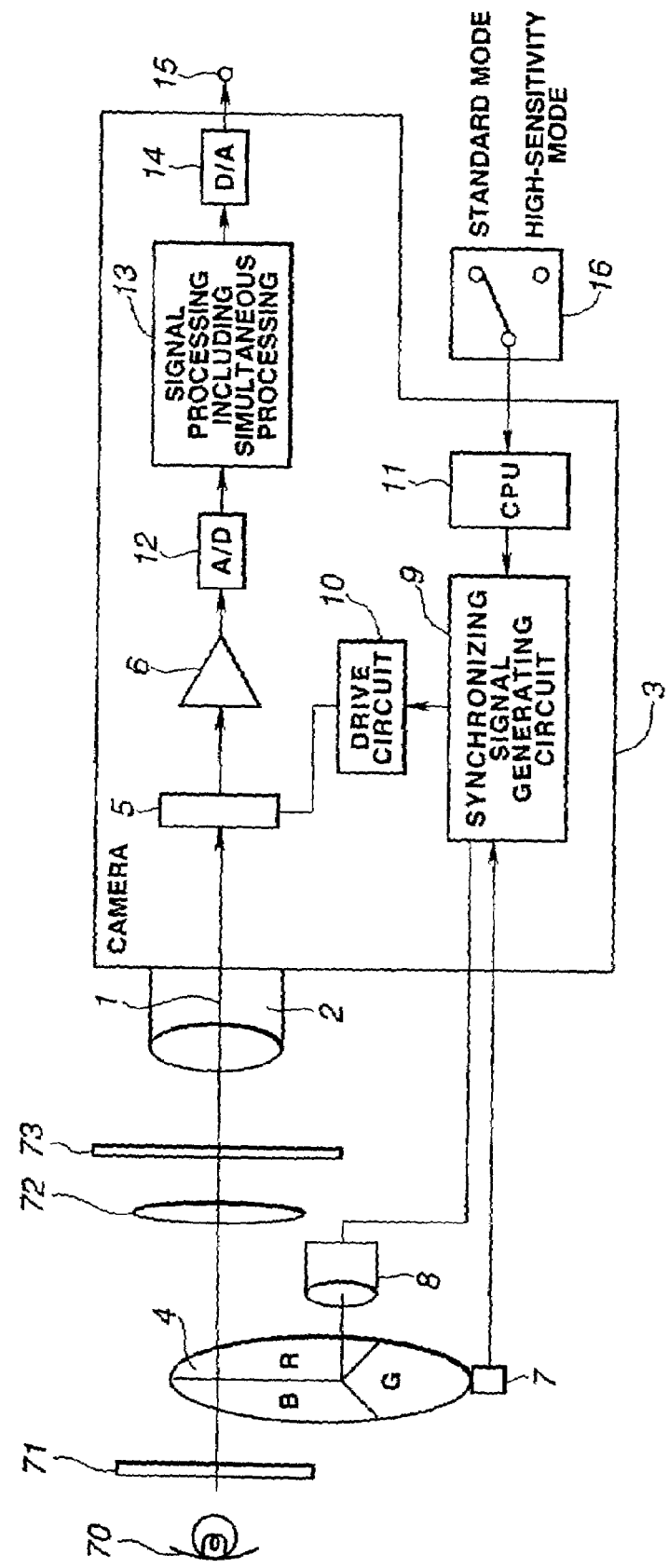
FIG. 20 is a block diagram showing a structure of a camera having a solid-state image pick-up system according to a twelfth embodiment of this invention.

In FIG. 20, a diffusion plate 71 is disposed in the rear of a light source 70. A light beam emitted from the light source 70 and diffused through the diffusion plate 71 passes through a rotary filter 4 located in the rear of the diffusion plate 71 and then condensed by a condenser lens 72 to be projected on, for example, a positive film 73 situated in the rear of the condenser lens 72 and serving as a subject. After passing through the positive film 73, the light forms an image, through an image pickup lens 2 of the camera, on an image pick-up surface of a solid-state image pick-up device 5 disposed in the rear of the image pick-up lens 2. A motor 8 for driving the rotary filter 4 is driven by a synchronizing signal generating circuit 9 within a camera body 3 as well as in the above-described first embodiment.

As described above, in this embodiment the rotary filter 4 is placed between the light source 70 and the positive film 73 serving as a subject, while in the first embodiment the rotary filter 4 is located between the image pick-up lens 2 and the solid-state image pick-up device 5 incorporated into the camera. The other structure and operation are the same as those in the above-described first embodiment and hence the description thereof will be omitted here. Incidentally, this embodiment is applicable not only to the first embodiment but also to the above-described other embodiments if necessary.

According to this embodiment, since the rotary filter 4 and the motor 8 for driving the rotary filter 4 are placed outside the camera body 3, the size-reduction of the camera body 3 is feasible.

Moreover, a description will be made hereinbelow of a thirteenth embodiment of the present invention.

Figure 21:
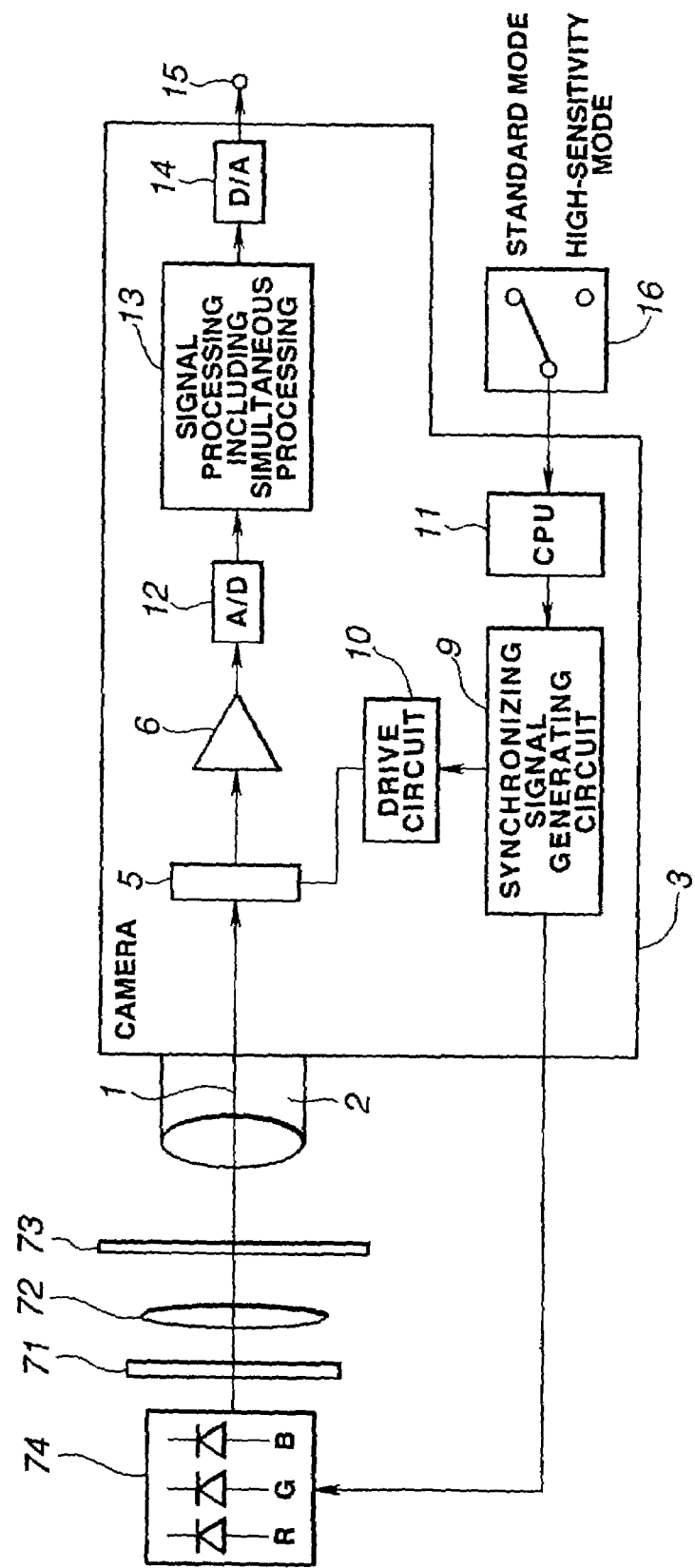
FIG. 21 is a block diagram showing a structure of a camera having a solid-state image pick-up system according to a thirteenth embodiment of this invention.
Figure 22:
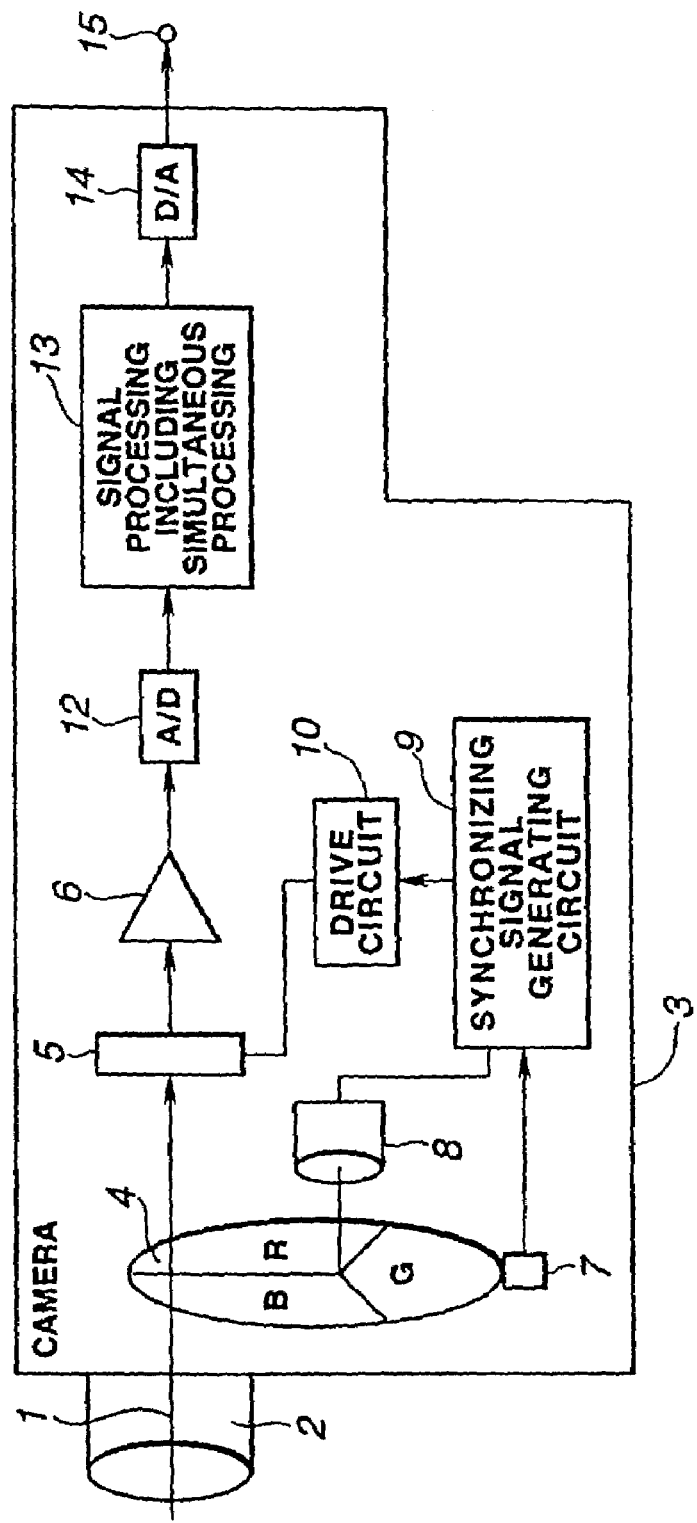
FIG. 22 is a block diagram showing a prior field sequence type solid-state image pick-up system.

In FIG. 21, a light source 74 is composed of three light-emitting diodes LR, LG and LB which selectively emit light beams of three colors: R (red), G (green), and B (blue). A diffusion plate 71 is placed in the rear of the light source 74. The light diffused by this diffusion plate 71 is condensed through a condenser lens 72 and then projected on, for example, a positive film 73 disposed in the rear of the condenser lens 72 and serving as a subject. After passing through the aforesaid positive film 73, the light forms an image, through an image pickup lens 2 of the camera, on an image pick-up surface of a solid-state image pick-up device 5 located in the rear of the image pick-up lens 2.

According to the twelfth embodiment, the selection of light with a color to be projected on the positive film 73 is made by the rotation of the rotary filter 4 and the accumulation time in the solid-state image pick-up device 5 is controlled by the rotating pried of the rotary filter 4, while in the thirteenth embodiment a given light-emitting diode is selected from the three color light-emitting diodes by a synchronizing signal generating circuit 9 to select a light beam with a given color to be projected on the positive film 73, and the accumulation time in the solid-state image pick-up device 5 is controlled by the light-emitting time controlled by the synchronizing signal generating circuit 9. The other structure and operation are the same as those of the twelfth embodiment and hence the description thereof will be omitted here. Incidentally, this embodiment is applicable to the above-described embodiments.

According to this embodiment, the rotary filter 4 and the motor 8 become unnecessary, thus allowing the size reduction of the camera body 3 and lessening the power consumption.

As described above, the above-mentioned embodiments can exhibit the following effects.

In the first embodiment, in the case of the high-sensitivity mode, the pictures in both fields are taken during one revolution, and therefore the time required for getting one frame picture is approximately 3 seconds, which signifies that the reception time is shortened to approximately half.

In the second embodiment, the dynamic picture detecting means 17 is provided, and in the case of a still picture, even in the standard mode the accumulation time in the solid-state image pick-up device is automatically lengthened, thus improving the S/N ratio. For example, if the accumulation time is doubled, the improvement is such that $S/N=2/\sqrt{2}=3$ dB.

Furthermore, in the case of shifting from a still picture to a dynamic picture in a high-sensitivity mode, the dynamic picture detecting circuit 17 detects that fact, so that the switching to the standard mode with a short accumulation time (1/60 second) in the solid-state image pick-up device is automatically made to lessen the color drift and allows following the movement of the subject on the monitor screen In the third embodiment, the movement of the stage of the microscope permits the distinction between a dynamic picture and a still picture, so that the switching to the standard mode is surely possible.

In the fourth embodiment, a dynamic picture/still picture is detectable, and the fixed accumulation time is not changed in the case of a still picture mode, but the automatic gain control circuit is provided to lengthen the accumulation time of the solid-state image pick-up device until it overflows with charges in the case of the still picture mode, so that the circuit side gain is lowered by a value corresponding to the increase in the signal level in the automatic gain control circuit. As a result, it is possible to improve the S/N ratio in accordance with the input signal level.

In the fifth embodiment, the focus detecting means for the image pick-up optical system is provided so that the switching from the high-sensitivity mode to the standard mode is automatically made, thus enhancing the controllability.

In the sixth embodiment, in the case of conducting the focus adjustment under a microscope, taking into consideration the fact that the focus adjustment is accomplished by rotating the focus adjusting section, a sensor is provided which responds when a person touches or rotates the focus adjusting section and the switching to the standard mode is made during the focus adjustment. Accordingly, in cases where the subject is extremely dark or in cases where the decision on the focusing condition is difficult with an in-focus detecting means such as a focus detection system because of no difference in brightness, it is possible to make a decision on the focus adjustment, so that the shifting to the standard mode is possible, thereby improving the controllability.

In the seventh embodiment, a solid-state image pickup device is used which conducts the amplification within a pixel of a CMD or the like in a circuit-like way, and making the use of the feature of this device that the pixel data is not broken irrespective of the number of read-out operations as long as it is not reset, the readout is always made at the standard television rate of 1/60 second regardless of the accumulation time, and the change of the accumulation time is possible with only the control of the reset pulse. In consequence, the circuit can be simplified as compared with the case of the use of the CCD.

In the eighth embodiment, the mechanical shutter is provided in addition to the structure of the first embodiment, and in the case of the high-sensitivity mode, the light obstruction is performed by the mechanical shutter after the exposure and the pixel data is read out while the shutter is in the closed condition, thus eliminating the problem that a difference in output level occurs between the odd number field and the even number field.

In the ninth embodiment, after the long-term exposure, for example after the exposure for 1 second, the light obstruction is achieved by the mechanical shutter and in the meantime the all the pixel data is read out in the standard mode, with the result that all the pixel data can be read out at the same timing as that for the high-sensitivity mode in the above-described first embodiment.

In the tenth embodiment, the light obstruction is made by a portion of the disc-like rotary filter, and therefore it is possible to exhibit the same effects as those of the above-described eighth embodiment without the need of the mechanical shutter and peripheral parts being further provided.

In the eleventh embodiment, it is possible to exhibit the same effects as those of the eighth embodiment without the need of using the motor, the light-obstructing plate, and so on dedicated to the camera with a mechanical shutter.

In this invention, it is apparent that working modes different in a wide range can be formed on this basis of this invention without departing from the spirit and scope of the invention. This invention is not restricted by any specific embodiment except being limited by the appended claims.

What is claimed is:

1. A solid-state image pick-up system comprising:
   a light source alternately emitting a plurality of color light beams at a given period to illuminate a subject;
   an image pick-up lens for receiving light from said subject;
   a solid-state image pick-up device for converting said subject light from said image pick-up lens into a given subject picture signal;
   image pick-up mode selecting means for selecting one of a standard mode for picking up a dynamic picture and a high-sensitivity mode for picking up a still picture; and
   control means for controlling said emission period for said light source responsive to an output of said image pick-up mode selecting means.

2. A solid-state image pick-up system as defined in claim 1, further comprising dynamic picture detecting means for detecting a signal corresponding to a movement of said subject, so that said standard mode is selected when said subject is decided as a dynamic picture based on an output of said dynamic picture detecting means, while said high-sensitivity mode is selected when said subject is decided as a still picture.

3. A solid-state image pick-up system as defined in claim 1, further comprising dynamic picture detecting means for detecting a movement of said subject, so that said high-sensitivity mode is set when said dynamic picture detecting means makes a decision that a picture picked up is a still picture.

4. A solid-state image pick-up system as defined in claim 1, further comprising dynamic picture detecting means for detecting movement of said subject, so that said image pick-up mode is changed to said standard mode when said image pick-up up mode is said high-sensitivity mode and said dynamic picture detecting means makes a decision that a picture picked up is a dynamic picture.

5. A solid-state image pick-up system as defined in claim 1, further comprising dynamic picture detecting means for detecting movement of said subject, said dynamic picture detecting means being constructed as a system for picking up a sample picture obtainable under a microscope and being provided in a stage sensor for detecting a movement of a stage of said microscope.

6. A solid-state image pick-up system as defined in claim 1, further comprising automatic gain control means, so that in said high-sensitivity mode an accumulation time is set to be as long as possible and gain control is conducted by said automatic gain control means.

7. A solid-state image pick-up system as defined in claim 1, further comprising automatic level control means, so that in said high-sensitivity mode an accumulation time is set to be as long as possible and level control is conducted by said automatic level control means.

8. A solid-state image pick-up system as defined in claim 1, further comprising automatic level control means, so that in said high-sensitivity mode an accumulation time is set to be as long as possible and one of gain control and level control is conducted by one of said automatic gain control means and said automatic level control means.

9. A solid-state image pick-up system as defined in claim 1, further comprising a focus detecting circuit of an optical image pick-up system, so that said image pick-up mode is shifted to said standard mode when said image pick-up mode is said high-sensitivity mode and it is decided as being in an out-of-focus condition.

10. A solid-state image pick-up system as defined in claim 1, further comprising a focus adjusting section for performing a focus adjustment of an image pick-up system, so that switching from said high-sensitivity mode to said standard mode is made when said image pick-up mode is said high-sensitivity mode and a detection is made when the user operates said focus adjusting section.

11. A solid-state image pick-up system as defined in claim 1, wherein said solid-state image pick-up device is composed of a non-broken and readable device and a read-out timing depends upon a standard television rate irrespective of an accumulation time.

12. A solid-state image pick-up system as defined in claim 1, further comprising a mechanical shutter having an exposure state when being in an open condition and having a light-obstructing state when being in a closed condition, so that pixel data is read out while said mechanical shutter is in the closed condition.

13. A solid-state image pick-up system as defined in claim 1, wherein said light source is a rotary filter having a light-obstructing section in a circumferential boundary between respective color areas.

14. A solid-state image pick-up system as defined in claim 1, further comprising a liquid crystal shutter, so that light-obstruction is made by said liquid crystal shutter after exposure read-out of pixel data is performed while said liquid crystal shutter is in a closed condition.

* * * * *